US009100558B2

(12) United States Patent
Tanaka et al.

(10) Patent No.: US 9,100,558 B2
(45) Date of Patent: Aug. 4, 2015

(54) COLOR IMAGING ELEMENT AND IMAGING APPARATUS

(71) Applicant: Fujifilm Corporation, Tokyo (JP)

(72) Inventors: Seiji Tanaka, Saitama (JP); Tomoyuki Kawai, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/314,782

(22) Filed: Jun. 25, 2014

(65) Prior Publication Data

US 2014/0307141 A1 Oct. 16, 2014

Related U.S. Application Data

(63) Continuation of application No. PCT/JP2012/083844, filed on Dec. 27, 2012.

(30) Foreign Application Priority Data

Dec. 27, 2011 (JP) .................................. 2011-286013

(51) Int. Cl.
*H04N 5/217* (2011.01)
*H04N 9/07* (2006.01)
*H04N 5/357* (2011.01)

(52) U.S. Cl.
CPC .............. *H04N 5/2173* (2013.01); *H04N 5/357* (2013.01); *H04N 9/07* (2013.01); *H04N 2209/045* (2013.01)

(58) Field of Classification Search
CPC ............ H04N 9/045; H04N 2209/046; H04N 2209/045; G06T 3/4015; H01L 27/144
USPC .......................................................... 348/280
See application file for complete search history.

(56) References Cited

U.S. PATENT DOCUMENTS 5,889,554 A     3/1999   Mutze
6,829,008 B1 * 12/2004   Kondo et al. ................. 348/302
(Continued)

FOREIGN PATENT DOCUMENTS

CN      101964348 A    2/2011
EP       1 793 620 A1    6/2007
(Continued)

OTHER PUBLICATIONS

International Search Report for PCT/JP2012/083844 mailed on Feb. 26, 2013.
(Continued)

*Primary Examiner* — Twyler Haskins
*Assistant Examiner* — Fayez Bhuiyan
(74) *Attorney, Agent, or Firm* — Birch, Stewart, Kolasch & Birch, LLP

(57) ABSTRACT

A color imaging element comprising: first group pixels; second group pixels at positions shifted half; and color filters which are arrayed on each of the first and second group pixels, wherein the color filter array includes a basic array pattern in which first filters corresponding to a first color and second filters corresponding to a second color whose contribution rates for acquiring a brightness signal are lower than a contribution rate of the first color are arrayed, and is formed by repeatedly arranging the basic array pattern, one or more of the first filters are arranged in horizontal, vertical, diagonal upper right and diagonal lower right directions, one or more of the second filters are arranged in the basic array pattern, and a ratio of a number of pixels of the first color is greater than a ratio of a number of pixels of each color of the second color.

13 Claims, 34 Drawing Sheets

(56) References Cited

U.S. PATENT DOCUMENTS

| | | | |
|---|---|---|---|
| 8,031,235 B2* | 10/2011 | Wada | 348/222.1 |
| 8,446,498 B2 | 5/2013 | Ishiwata et al. | |
| 2002/0149686 A1 | 10/2002 | Taubman | |
| 2004/0017497 A1 | 1/2004 | Suzuki et al. | |
| 2004/0109068 A1 | 6/2004 | Mitsunaga et al. | |
| 2004/0169747 A1 | 9/2004 | Ono et al. | |
| 2005/0225655 A1* | 10/2005 | Suzuki | 348/272 |
| 2006/0012808 A1 | 1/2006 | Mizukura et al. | |
| 2006/0203113 A1 | 9/2006 | Wada et al. | |
| 2007/0153104 A1 | 7/2007 | Ellis-Monaghan et al. | |
| 2008/0151083 A1 | 6/2008 | Hains et al. | |
| 2009/0200451 A1 | 8/2009 | Conners | |
| 2011/0069189 A1 | 3/2011 | Venkataraman et al. | |
| 2012/0025060 A1 | 2/2012 | Iwata | |
| 2013/0010078 A1 | 1/2013 | Aoki | |
| 2013/0044244 A1 | 2/2013 | Kawai et al. | |

FOREIGN PATENT DOCUMENTS

| | | |
|---|---|---|
| JP | 2-210996 A | 8/1990 |
| JP | 8-23542 A | 1/1996 |
| JP | 8-23543 A | 1/1996 |
| JP | 11-285012 A | 10/1999 |
| JP | 2000-308080 A | 11/2000 |
| JP | 2003-7994 A | 1/2003 |
| JP | 2003-116144 A | 4/2003 |
| JP | 2003-284084 A | 10/2003 |
| JP | 2004-55786 A | 2/2004 |
| JP | 2003-221839 A | 8/2004 |
| JP | 2004-266369 A | 9/2004 |
| JP | 2004-336468 A | 11/2004 |
| JP | 2005-136766 A | 5/2005 |
| JP | 2005-286104 A | 10/2005 |
| JP | 2007-184904 A | 7/2007 |
| JP | 2007-306064 A | 11/2007 |
| JP | 2007-306490 A | 11/2007 |
| JP | 2007-325145 A | 12/2007 |
| JP | 2008-160674 A | 7/2008 |
| JP | 2008-193714 A | 8/2008 |
| JP | 2008-236620 A | 10/2008 |
| JP | 2010-512048 A | 4/2010 |
| JP | 2010-153511 A | 7/2010 |
| JP | 2011-523538 A | 8/2011 |
| WO | WO 02/056604 A1 | 7/2002 |
| WO | WO 2008/066698 A2 | 6/2008 |
| WO | WO 2009/151903 A2 | 12/2009 |
| WO | WO 2011/118089 A1 | 9/2011 |
| WO | WO 2011/132619 A1 | 10/2011 |

OTHER PUBLICATIONS

Office Action issued in Chinese Patent Application No. 201180022503.3, issued on May 23, 2013.
Written Opinion of the International Searching Authority for PCT/JP2012/083844 mailed on Feb. 26, 2013.
Written Opinion of the International Searching Authority issued in PCT/JP2012/080898, mailed on Jan. 22, 2013.
Written Opinion of the International Searching Authority issued in PCT/JP2012/080899, mailed on Jan. 15, 2013.
Written Opinion of the International Searching Authority issued in PCT/JP2012/081644, mailed on Jan. 15, 2013.
Written Opinion of the International Searching Authority issued in PCT/JP2012/083583, mailed on Jan. 29, 2013.
Hirakawa et al., "Spatio-Spectral Color Filter Array Design for Optimal Image Recovery", IEEE Transactions on Image Processing, vol. 17, No. 10, Oct. 1, 2008, pp. 1876-1890.
Supplemental European Search Report dated Aug. 4, 2014 for Application No. EP 11 85 9479.
Supplemental European Search Report dated Jan. 27, 2015 for Application No. EP 12 80 4973.
Supplemental European Search Report dated Oct. 28, 2014 for Application No. EP 11 85 9950.
Chinese Office Action issued Apr. 27, 2015 for corresponding Chinese Application No. 201280065014.0 with an English translation.

* cited by examiner

41(COLOR IMAGING ELEMENT)

COLOR IMAGING ELEMENT AND IMAGING APPARATUS

CROSS-REFERENCE TO RELATED APPLICATIONS

This application is a Continuation of PCT International Application No. PCT/JP2012/083844 filed on Dec. 27, 2012, which claims priority under 35 U.S.C. §119(a) to Japanese Patent Application No. 2011-286013 filed on Dec. 27, 2011. Each of the above application(s) is hereby expressly incorporated by reference, in its entirety, into the present application.

BACKGROUND OF THE INVENTION

1. Field of the Invention

The present invention relates to a color imaging element and an imaging apparatus, and, in particular, relates to a color imaging element and an imaging apparatus which can reduce generation of color moire and convert a resolution into a higher resolution.

2. Description of the Related Art

A digital camera (imaging apparatus) which has a color imaging element such as a CCD color imaging element or a CMOS color imaging element and which acquires digital images is spreading. In recent years, digital cameras can generate various items of image data according to types of color imaging elements.

For example, digital cameras described in Japanese Patent Application Laid-Open No. 2004-55786, Japanese Patent Application Laid-Open No. 2004-336468, and Japanese Patent Application Laid-Open No. 2008-160674 (PTL 1 to 3) include first group RGB pixels in which all pixels of color imaging elements are arrayed according to a predetermined pattern, and second group pixels which have the same array pattern as the array pattern of the first group RGB pixels and are each arranged to be adjacent to the first group RGB pixels. Specifically, the second group RGB pixels are each arranged by being shifted a ½ pixel interval from the first group RGB pixels in the horizontal and vertical directions. Consequently, a normally-shot image configured by one of the first group RGB pixels and the second group RGB pixels as well as a high resolution image configured by both of the first group and the second group RGB pixels are acquired. Further, it is possible to acquire images of different sensitivities by making signal charge accumulation times (electrical exposure times) of the first group RGB pixels and the second group RGB pixels different and, consequently, it is possible to acquire a wide DR image whose dynamic range (DR) is expanded (enlarged) based on these two types of the images of different sensitivities.

Furthermore, digital cameras described in Japanese Patent Application Laid-Open No. 2004-336468, Japanese Patent Application Laid-Open No. 2005-286104, Japanese Patent Application Laid-Open No. 2007-306064, Japanese Patent Application Laid-Open No. 2007-325145, and Japanese Patent Application Laid-Open No. 2008-193714 (PTL 4 to 8) can acquire images of different sensitivities by making areas of first group RGB pixels and second group RGB pixels different and, consequently, acquire a wide DR image.

Still further, when first group pixels and second group pixels are phase difference pixels whose sensitivities become high in response to lights incident from different directions, it is possible to acquire a stereoscopic disparity image configured by viewpoint images of two viewpoints having a disparity.

These various types of digital cameras are usually provided with single-plated color imaging elements. In a single-plate color imaging element, a color filter of a single color is provided on each pixel, and therefore each pixel has only color information of a single color. Hence, an output image of a single-plate color imaging element becomes a RAW image (mosaic image), and therefore multichannel images are obtained by processing (demosaicing processing) of interpolating pixels of deficient colors from surrounding pixels. What matters in this case is reproduction characteristics of a high frequency image signal. Since the color imaging element is likely to cause aliasing in a captured image compared to a monochrome imaging element, an important task is to convert a resolution into a high resolution by expanding a reproduction band while suppressing generation of color moire (false color).

The demosaicing processing refers to processing of calculating all pieces of color information per pixel from a mosaic image corresponding to a color filter array of a single-plate color imaging element, and is also referred to as concurrent processing. For example, when an imaging element includes color filters of three colors RGB, the demosaicing processing is the process for calculating all pieces of color information of RGB per pixel from a mosaic image configured by RGB.

In a primary color Bayer array, which is the most widely used color array of color filters in the single-plate color imaging elements, green (G) pixels are arranged in a checkered pattern and red (R) and blue (B) are arranged in a line sequence, and therefore there is a problem with reproduction precision when G signals generate high frequency signals in diagonal directions, and when R and B signals generate high frequency signals in horizontal and vertical directions.

When a monochrome vertical stripe pattern (high frequency image) as indicated by A portion in FIG. 35 is incident on a color imaging element including color filters of a Bayer array indicated by B portion in FIG. 35, a color image of a mosaic pattern is provided in which R is light and flat, B is dark and flat and G is a light and dark as indicated by C portion to E portion in FIG. 35 upon comparison with each color by sorting the pattern into the Bayer color array. While originally a density difference (level difference) is not produced between RGB since an image is monochrome, a color is applied to the image depending on a color array and an input frequency.

Similarly, when a diagonally monochrome high frequency image as indicated by A portion in FIG. 36 is incident on an imaging element including color filters of a Bayer array indicated by B portion in FIG. 36, a color image is provided in which R and B are light and flat and G is dark and flat as indicated by C portion to E portion in FIG. 36 upon comparison with each color by sorting the pattern into the Bayer color array. If a value of black is 0 and a value of white is 255, the diagonally monochrome high frequency image becomes green-colored since only G takes 255. Thus, the Bayer array cannot correctly reproduce a diagonal high frequency image.

Generally, in an imaging apparatus which uses single-plate color imaging elements, optical low pass filters made of a birefringent material such as crystal are arranged in front of the color imaging elements to optically suppress a high frequency wave. This method can reduce a tinge due to aliasing of a high frequency signal, but has a problem that the resolution lowers due to a negative effect of this method.

To solve such a problem, color imaging elements is proposed which adopt a three color random array which satisfies array limitation conditions that arbitrary pixels of interest are adjacent to three colors including colors of the pixels of interest in one of four sides of the pixels of interest (Japanese Patent Application Laid-Open No. 2000-308080; PTL 9).

Further, an image sensor is proposed which has a plurality of filters of different spectral sensitivities having a color filter array in which first filters and second filters are alternately arranged in a first predetermined cycle in one of diagonal directions of a pixel grid of the image sensor, while they are alternately arranged in a second predetermined cycle in the other one of the diagonal directions (Japanese Patent Application Laid-Open No. 2005-136766; PTL 10).

Furthermore, in a color solid state imaging element of three primary colors of RGB, a color array is proposed which makes each appearance probability of RGB equal, and allows arbitrary lines (horizontal, vertical and diagonal lines) on an imaging plane to transit all colors by arranging sets of three pixels of horizontally-arranged R, G and B in a zig-zag pattern in the vertical direction (Japanese Patent Application Laid-Open No. 11-285012; PTL 11).

Still further, a color imaging element is proposed in which R and B of the three primary colors of RGB are arranged every three pixels in the horizontal and the vertical directions, and G is arranged between these R and B (Japanese Patent Application Laid-Open No. 8-23543; PTL 12).

SUMMARY OF THE INVENTION

The color imaging element described in PTL 9 needs to optimize each random pattern when demosaicing processing is performed at a subsequent stage since a filter array is random, and has a problem that the demosaicing processing becomes complicated. Further, the random array is effective for color moire of a low frequency, but is not effective for a false color of a high frequency portion.

Furthermore, the image sensor described in PTL 10 has a problem that pixel reproduction precision is poor in a limited resolution region (in the diagonal directions in particular), because G pixels (brightness pixels) are arranged in a checkered pattern.

The color solid state imaging element described in PTL 11 provides an advantage that it is possible to suppress generation of a false color since there are filters of all colors on arbitrary lines, but has a problem that high frequency reproducibility lowers compared to the Bayer array because the ratios of the numbers of pixels of RGB are equal. In case of the Bayer array, the ratio of the number of pixels of G, which contributes the most to acquisition of a brightness signal, is twice as much as the numbers of pixels of R and B.

On the other hand, in the color imaging element described in PTL 12, the ratio of the number of pixels of G with respect to the numbers of pixels of R and B is higher than the ratio of that in the Bayer array, but is not effective for a false color of a high frequency portion in a horizontal or vertical direction because there are lines of only G pixels in the horizontal or vertical direction.

The present invention has been made in light of such a situation, and an object of the present invention is to provide a color imaging element and an imaging apparatus which can suppress generation of a false color and convert a resolution into a higher resolution, and simplify processing at a subsequent stage compared to a conventional random array.

To achieve the above-mentioned object, an invention according to one aspect of the present invention has: first group pixels which are formed with photoelectric conversion elements arrayed in a matrix pattern at a predetermined pixel interval in each of a horizontal direction and a vertical direction; second group pixels which are formed with photoelectric conversion elements arrayed at positions shifted half the predetermined pixel interval from each photoelectric conversion element of the first group pixels in each of the horizontal direction and the vertical direction; and color filters which are arrayed on each of the first and second group pixels according to a same specific color filter array, and the color filter array includes a basic array pattern in which first filters corresponding to a first color with one or more colors and second filters corresponding to a second color with two or more colors whose contribution rates for acquiring a brightness signal are lower than a contribution rate of the first color are arrayed, and is formed by repeatedly arranging the basic array pattern in the horizontal direction and the vertical direction, one or more of the first filters are arranged on each line in horizontal, vertical, diagonal upper right and diagonal lower right directions of the color filter array, one or more of the second filters corresponding to each color of the second color are arranged on each line in the horizontal and vertical directions of the color filter array in the basic array pattern, and a ratio of a number of pixels of the first color corresponding to the first filters is greater than a ratio of a number of pixels of each color of the second color corresponding to the second filters.

In the invention according to one aspect of the present invention, the first filters corresponding to the first color whose contribution rate for acquiring a brightness signal is high are arranged on each filter line in the horizontal, vertical, diagonal upper right and diagonal lower right directions of the color filter array, so that it is possible to increase reproduction precision of demosaicing processing in a high frequency region. Further, one or more of the second filters corresponding to each color of the second color with two or more colors other than the first color are also arranged on each filter line in the horizontal and vertical directions of the color filter array, so that it is possible to suppress generation of color moire (false color) and convert a resolution into a high resolution.

Further, in the color filter array, basic array patterns are repeatedly arranged in the horizontal and the vertical directions, so that it is possible to perform processing according to a repetition pattern when performing the demosaicing processing at a subsequent stage, and simplify the processing at the subsequent stage compared to the conventional random array.

Furthermore, the ratios of the number of pixels of the first color corresponding to the first filters and the number of pixels of each color of the second color with two or more colors corresponding to the second filters are different, and in particular the ratio of the number of pixels of the first color whose contribution rate for acquiring a brightness signal is high is greater than a ratio of the number of pixels of each color of the second color corresponding to the second filters, so that it is possible to suppress aliasing and high frequency reproducibility is also good.

In the color imaging element according to another aspect of the present invention, the first group pixels selectively receive subject lights which transmit through one of two different regions of a shooting optical system, and the second group pixels selectively receive the subject lights which transmit through the other one of the two regions. Consequently, it is possible to acquire a stereoscopic disparity image.

In the color imaging element according to still another aspect of the present invention, it is preferable that the two regions are regions symmetric with respect to an optical axis of the shooting optical system. Consequently, it is possible to acquire a stereoscopic disparity image.

In the color imaging element according to still another aspect of the present invention, sensitivities of the second group pixels are lower than sensitivities of the first group pixels. Consequently, it is possible to acquire an image whose dynamic range is expanded based on an image configured by the output signals from the first group pixels and an image configured by the output signals from the second group pixels.

In the color imaging element according to still another aspect of the present invention, areas of the second group pixels are smaller than areas of the first group pixels. Consequently, it is possible to acquire an image whose dynamic range is expanded based on an image configured by the output signals from the first group pixels and an image configured by the output signals from the second group pixels.

In the color imaging element according to still another aspect of the present invention, optical transmittances of the color filters on the second group pixels are lower than optical transmittances of the color filters on the first group pixels. Consequently, it is possible to acquire an image whose dynamic range is expanded based on an image configured by the output signals from the first group pixels and an image configured by the output signals from the second group pixels.

Microlenses are provided above each of the first and second filters, and the microlenses positioned above the second group pixels are smaller than the microlenses positioned above the first group pixels. Consequently, it is possible to acquire an image whose dynamic range is expanded based on an image configured by the output signals from the first group pixels and an image configured by the output signals from the second group pixels.

An imaging apparatus according to one aspect of the present invention has: the color imaging element according to one aspect of the present invention; and a shooting optical system which forms subject light on an imaging plane of the color imaging element. Consequently, it is possible to suppress generation of a false color and convert a resolution into a higher resolution, and simplify processing at a subsequent stage compared to a conventional random array.

The imaging apparatus according to another aspect of the present invention has a first image generating device which generates an image by adding output signals outputted from each of the first and second group pixels which are mutually adjacent in the diagonal upper right direction or in the diagonal lower right direction and are arranged below the color filters of a same color. Consequently, it is possible to acquire a high sensitivity image of low noise.

The imaging apparatus according to still another aspect of the present invention has a second image generating device which generates an image including a larger number of pixels than respective numbers of pixels of the first and second group pixels based on output signals from the first group pixels and output signals from the second group pixels. Consequently, it is possible to acquire a high resolution image.

The imaging apparatus according to still another aspect of the present invention has: a charge accumulation time adjusting device which makes charge accumulation times of the second group pixels shorter than charge accumulation times of the first group pixels; and a third image generating device which generates an image whose dynamic range is expanded based on an image configured by output signals from the first group pixels and an image configured by output signals from the second group pixels. Consequently, it is possible to acquire an image whose dynamic range is expanded without making areas of the first pixel group and the second pixel group different.

An imaging apparatus according to still another aspect of the present invention has: the color imaging element according to another aspect of the present invention which includes the first group pixels and second group pixels which selectively receive subject lights which transmit two regions of the optical shooting system, respectively; the shooting optical system which forms subject light on an imaging plane of the color imaging element; and a fourth image generating device which generates a disparity image including a first image configured by the output signals from the first group pixels and a second image configured by the output signals from the second group pixels. Consequently, it is possible to acquire a stereoscopic disparity image.

An imaging apparatus according to still another aspect of the present invention has: the color imaging element according to still another aspect of the present invention which includes high sensitivity pixels and low sensitivity pixels; a shooting optical system which forms subject light on an imaging plane of the color imaging element; and a third image generating device which generates an image whose dynamic range is expanded based on an image configured by output signals from the first group pixels and an image configured by output signals from the second group pixels.

According to the present invention, one or more of the first filters corresponding to the first color whose contribution rate for acquiring a brightness signal is high are arranged on each filter line in the horizontal, vertical, diagonal upper right and diagonal lower right directions of the color filter array, and the ratio of the number of pixels of the first color corresponding to the first filters is greater than the ratio of the number of pixels of the second color corresponding to the second filters with two or more colors other than the first color, so that it is possible to increase reproduction precision of demosaicing processing in a high frequency region, and suppress aliasing.

Further, one or more of the second filters corresponding to each color of the second color with two or more colors other than the first color are arranged on each filter line in the horizontal and vertical directions of the color filter array in the basic array pattern, so that it is possible to suppress generation of color moire (false color) and convert a resolution into a high resolution.

Further, in the array of the color filter according to the present invention, the basic array patterns are repeated in the horizontal and the vertical directions, so that it is possible to perform processing according to a repetition pattern when performing demosaicing processing at a subsequent stage, and simplify the processing at a subsequent stage compared to the conventional random array.

DETAILED DESCRIPTION OF THE PREFERRED EMBODIMENTS

Preferred embodiments of the present invention are described below in detail with reference to the accompanying drawings.

Entire Configuration of Digital Camera According to First Embodiment

Figure 1:
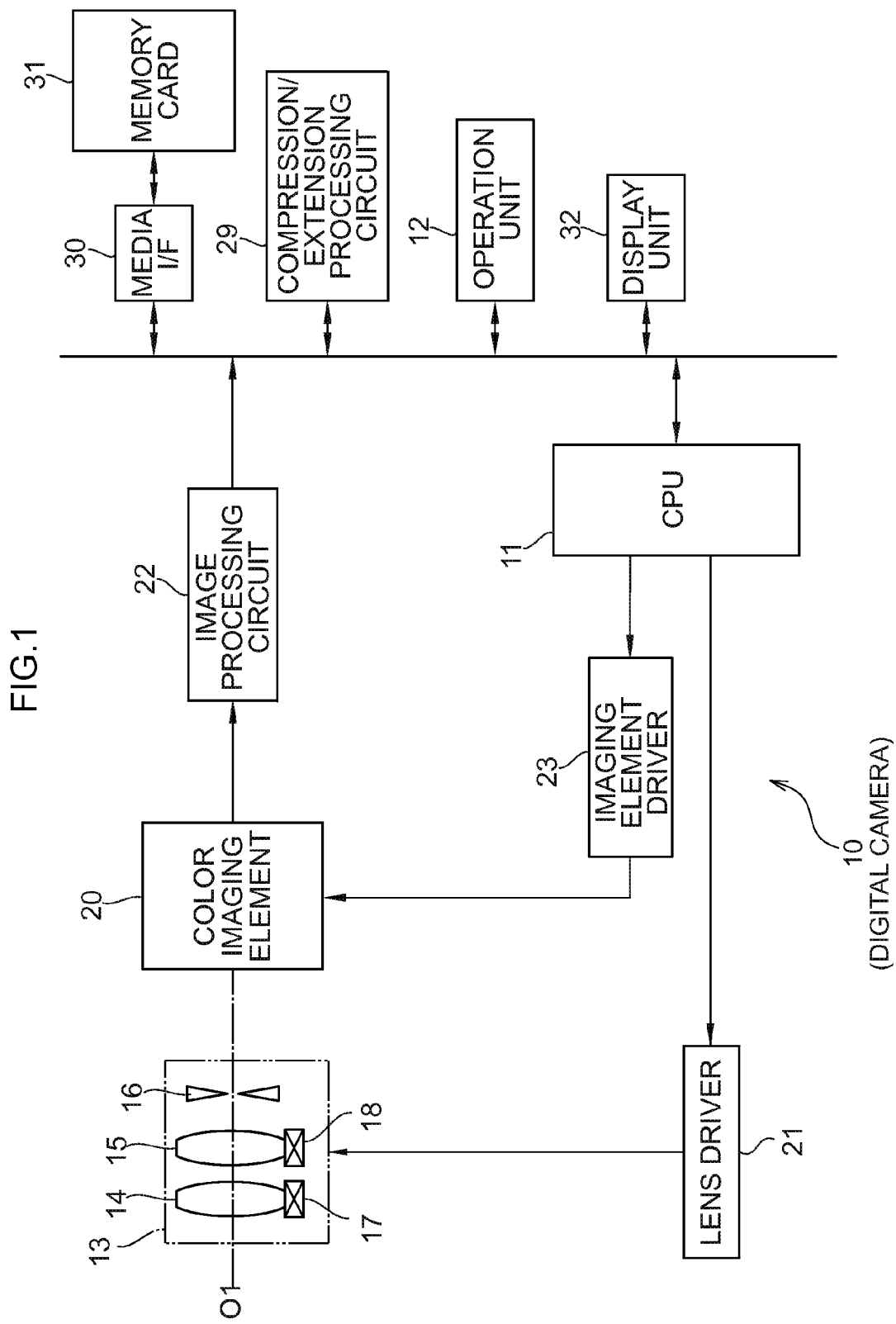
FIG. 1 is a view illustrating a digital camera of the first embodiment that has a single-plate color imaging element according to the present invention.

FIG. 1 is a block diagram of a digital camera (imaging apparatus) 10 of the first embodiment that has a color imaging element according to the present invention. A CPU 11 of the digital camera 10 sequentially executes various programs or various items of data read from a not illustrated memory based on a control signal from an operation unit 12 including a shutter button and various operation buttons, and integrally controls each unit of the digital camera 10.

In a lens unit (shooting optical system) 13, a zoom lens 14, a focus lens 15, a mechanical shutter 16 and the like are mounted. The zoom lens 14 and the focus lens 15 are driven by a zoom mechanism 17 and a focus mechanism 18, respectively, and moved forward and backward along an optical axis O1.

The mechanical shutter 16 has a movable part (not illustrated) which moves between a closing position at which subject light is prevented from being incident on a color imaging element 20 and an opening position at which subject light is allowed to be incident. The mechanical shutter 16 opens/blocks an optical path which leads from each of the lenses 14 and 15 to the color imaging element 20 by moving the movable part to each position. Note that the mechanical shutter 16 has an aperture which controls the amount of subject light incident on the color imaging element 20. Operations of the mechanical shutter 16, the zoom mechanism 17 and the focus mechanism 18 are controlled by the CPU 11 through a lens driver 21.

The color imaging element 20 is arranged at the back of the lens unit 13. The color imaging element 20 converts subject light from each of the lenses 14 and 15 into an electric output signal, and outputs it. An imaging element driver 23 controls driving of the color imaging element 20 under control of the CPU 11.

An image processing circuit 22 applies various types of processing such as gradation conversion, white balance correction and γ correction processing to an output signal inputted from the color imaging element 20, and generates image data. Hereinafter, image data generated by the image processing circuit 22 upon a normal shooting mode (hereinafter referred to as a normal shooting mode) is referred to as a normally-shot image data.

A compression/extension processing circuit 29 applies compression processing to each image data processed by the image processing circuit 22. Further, the compression/extension processing circuit 29 applies extension processing to compressed image data acquired from a memory card 31 through a media I/F 30. The media I/F 30 records and reads each image data in and from the memory card 31. A liquid crystal display is used for the display unit 32 to display a through image and a playback image.

Note that although not illustrated, the digital camera 10 is provided with an autofocus AF detection circuit, an AE detection circuit and the like. The CPU 11 executes AF processing by driving the focus mechanism 18 through the lens driver 21 based on a detection result of the AF detection circuit. Further, the CPU 11 executes AE processing by driving the mechanical shutter 16 through the lens driver 21 based on a detection result of the AE detection circuit.

Color Imaging Element According to First Embodiment

Figure 2:
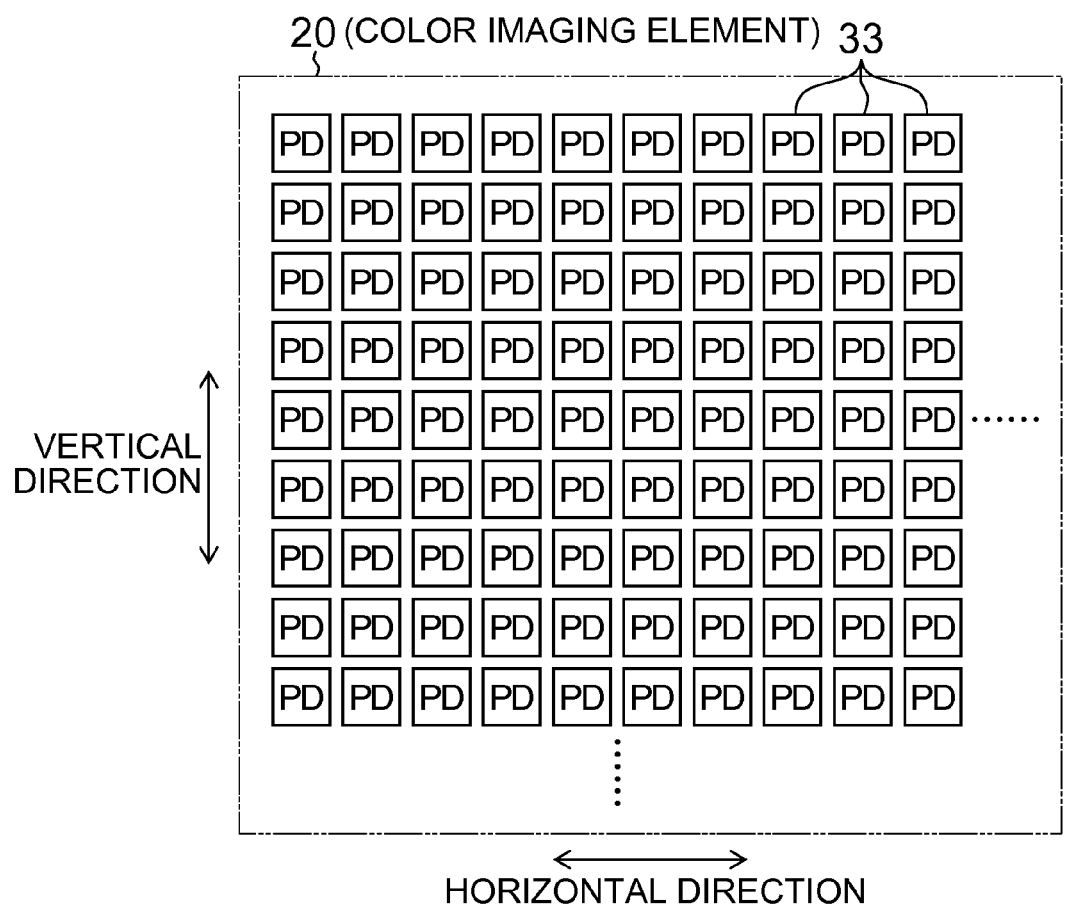
FIG. 2 is a view illustrating a pixel array of the color imaging element of the digital camera according to the first embodiment.
Figure 3:
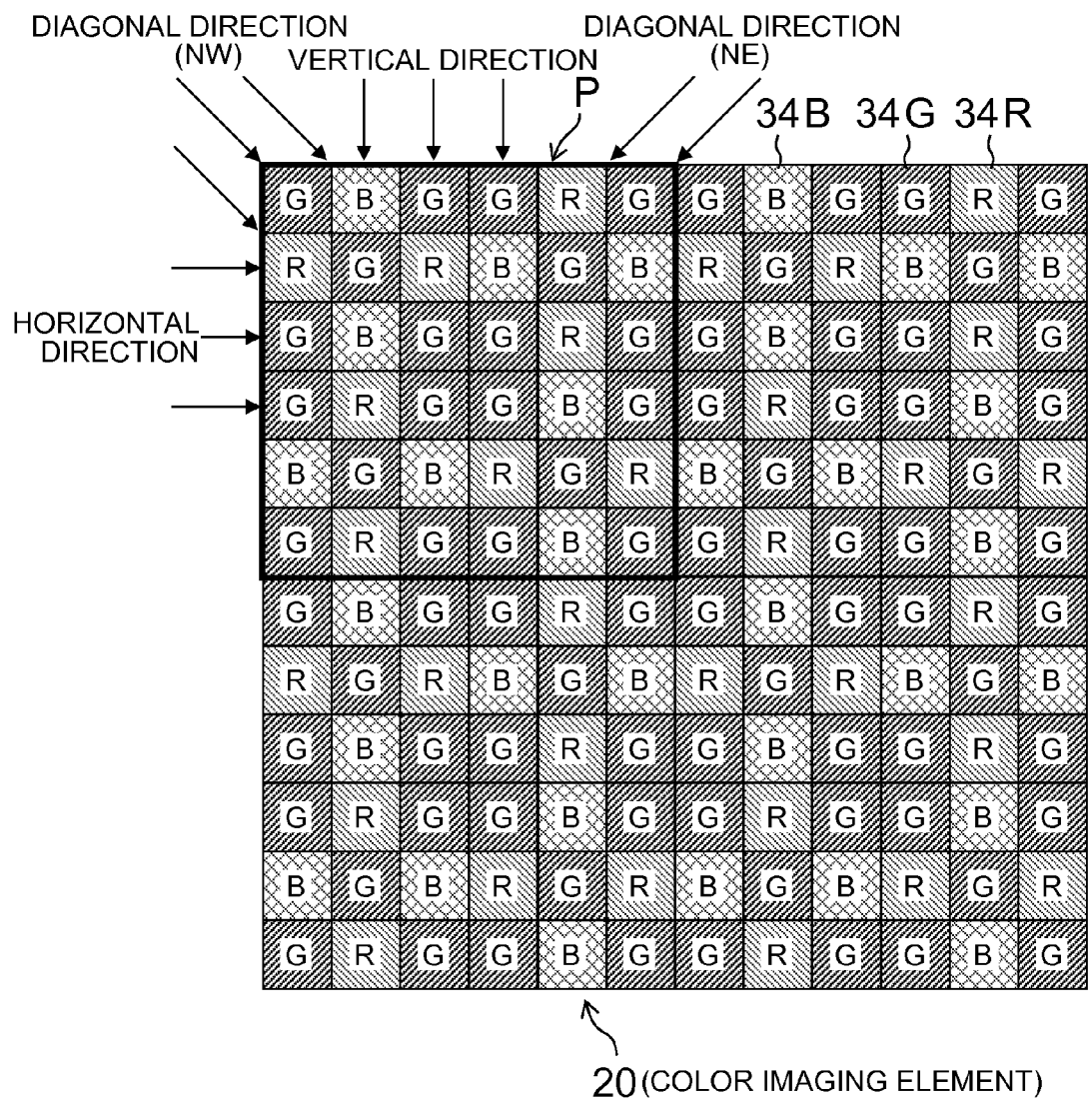
FIG. 3 is a view illustrating a color filter array of the color imaging element according to the first embodiment.

FIGS. 2 and 3 are views illustrating a single-plate color imaging element according to a first embodiment of the present invention. FIG. 2 illustrates a pixel array of pixels provided to the color imaging element 20 and FIG. 3 illustrates a color filter array of color filters. Note that the color imaging element 20 may be various types of imaging elements such as a CCD (Charge Coupled Device) color imaging element and a CMOS (Complementary Metal Oxide Semiconductor) color imaging element.

As illustrated in FIG. 2, the color imaging element 20 has a plurality of pixels 33 which include photoelectric conversion elements PD arrayed (two-dimensionally arrayed) in the horizontal direction and the vertical direction, and color filters arranged above the light receiving plane of each pixel and arrayed as a color filter array illustrated in FIG. 3. One of color filters of three primary colors of RGB (hereinafter referred to as an R filter, a G filter and a B filter) 34R, 34G and 34B is arranged above each pixel. Hereinafter, a pixel on which the R filter 34R is arranged is referred to as an "R pixel", a pixel on which the G filter 34G is arranged is referred to as a "G pixel", and a pixel on which the B filter 34B is arranged is referred to as a "B pixel". In this regard, "above" refers to a direction from which subject light is incident on the imaging plane of the color imaging element 20.

<Features of Color Filter Array>

The color filter array of the color imaging element 20 according to the first embodiment includes the following features (1), (2), (3), (4), (5) and (6).

[Feature (1)]

The color filter array illustrated in FIG. 3 includes a basic array pattern P (a pattern indicated by a bold frame in the figure) formed with a square array pattern corresponding to 6×6 pixels, and this basic array pattern P is repeatedly arranged in the horizontal direction and the vertical direction. That is, in this color filter array, the R filters 34R, the G filters 34G and the B filters 34B of each color of R, G and B are cyclically arrayed.

As described above, the R filters 34R, the G filters 34G and the B filters 34B are cyclically arrayed, so that it is possible to perform processing according to a repetition pattern when performing demosaicing processing and the like on R, G and B signals read from the color imaging element 20.

Further, when thinning processing is performed in units of the basic array patterns P to reduce an image, the color filter array after the thinning processing is the same as the color filter array before the thinning processing and a common processing circuit can be used.

[Feature (2)]

In the color filter array illustrated in FIG. 3, one or more of the G filters 34G corresponding to a color (the color of G in the present embodiment) which contributes the most to acquisition of a brightness signal are arranged on each filter line in the horizontal, vertical and diagonal (NE, NW) directions of the color filter array. In this regard, NE designates a diagonal upper right direction, and NW designates a diagonal lower right direction. The diagonal upper right and lower right directions are each of the directions of 45° with respect to the horizontal direction in the case of, for example, a square array of pixels, and are the directions of diagonal lines of a rectangular shape in the case of a rectangular array of pixels, and the angle of its direction may vary according to lengths of long sides and short sides.

The G filters 34G corresponding to brightness pixels are arranged on each filter line in the horizontal, vertical and diagonal (NE, NW) directions of the color filter array, so that it is possible to increase reproduction precision of the demosaicing processing in a high frequency region irrespectively of a direction in which a high frequency wave is provided.

[Feature (3)]

According to the basic array pattern P of the color filter array illustrated in FIG. 3, the numbers of pixels of R pixels, G pixels and B pixels corresponding to the RGB filters 34R, 34G and 34B in this basic array pattern are 8 pixels, 20 pixels and 8 pixels, respectively. That is, the ratios of the numbers of pixels of the RGB pixels are 2:5:2, and the ratio of the number of pixels of G pixels which contributes the most to acquisition of a brightness signal is greater than ratios of the numbers of pixels of R pixels and B pixels of other colors.

As described above, the ratios of the number of pixels of G pixels and the numbers of pixels of R and B pixels are different and in particular the ratio of the number of pixels of G pixels which contribute the most to acquisition of a brightness signal is greater than the ratios of the numbers of pixels of R and B pixels, so that it is possible to suppress aliasing upon demosaicing processing and it is also possible to enhance high frequency reproducibility.

[Feature (4)]

In the color filter array illustrated in FIG. 3, one or more of the R filters 34R and B filters 34B corresponding to two or more colors of other colors (R and B colors in the present embodiment) except for the above-mentioned G color are arranged on each filter line in the horizontal and vertical directions of the color filter array in each basic array pattern P.

The R filters 34R and the B filters 34B are each arranged on each filter line in the horizontal and vertical directions of the color filter array, so that it is possible to suppress generation of color moire (false color). Consequently, it is possible to prevent an optical low pass filter which suppresses generation of a false color from being arranged on an optical path from an incident surface to the imaging plane in the optical system, or to apply an optical low pass filter whose function of cutting a high frequency component for preventing generation of a false color is weak even when the optical low pass filter is applied, and thus it is possible to prevent the resolution from lowering.

Figure 4:
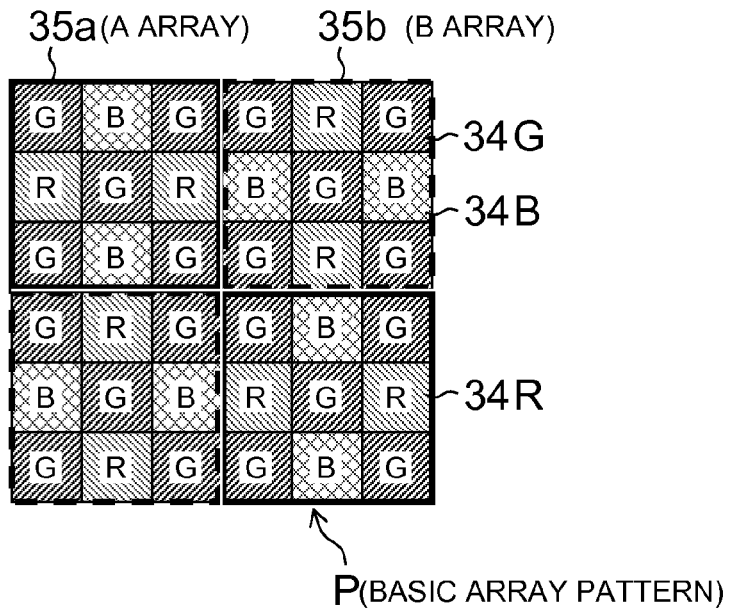
FIG. 4 is a view illustrating a basic array pattern included in a color filter array of the color imaging element according to the first embodiment.

FIG. 4 illustrates a state where the basic array pattern P illustrated in FIG. 3 is divided by four into 3×3 pixels.

As illustrated in FIG. 4, the basic array pattern P can also be regarded as an array in which A arrays 35a of 3×3 pixels surrounded by solid lines in the figure and B arrays 35b of 3×3 pixels surrounded by broken lines in the figure are alternately arranged in the horizontal and vertical directions.

Each of the A arrays 35a and the B arrays 35b has the G filters 34G, which are brightness pixels, arranged at four corners and in the center along both diagonal lines. Further, in the A array 35a, the R filters 34R are arrayed in the horizontal direction across the center G filter 34G, and the B filters 34B are arrayed in the vertical direction. Meanwhile, in the B array 35b, the B filters 34B are arrayed in the horizontal direction across the center G filter 34G, and the R filters 34R are arrayed in the vertical direction. That is, although a positional relationship between the R filters 34R and the B filters 34B is reversed between the A array 35a and the B array 35b, other arrangement is the same.

Figure 5:
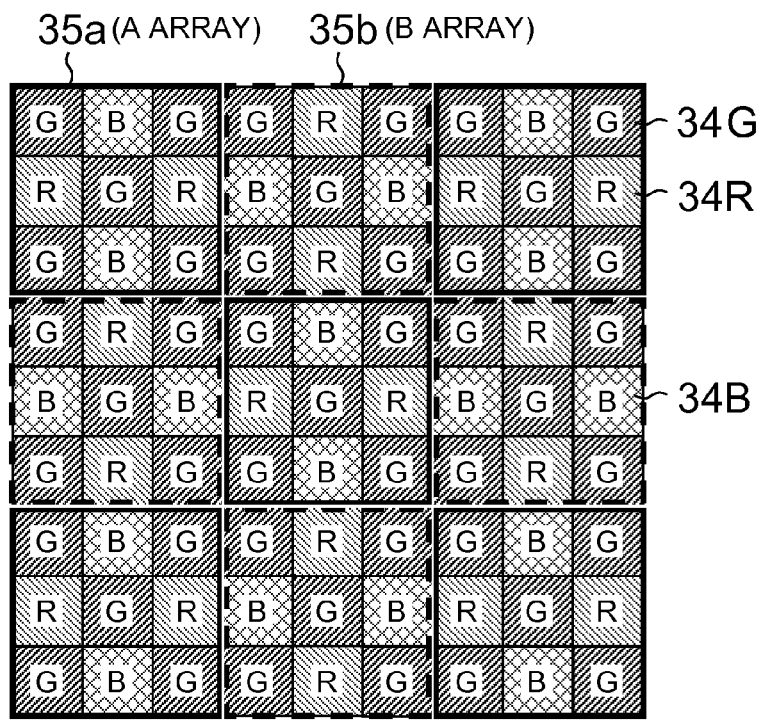
FIG. 5 is a view illustrating an arrangement in which basic array patterns of 6×6 pixels included in the color filter array of the color imaging element according to the first embodiment are divided into A arrays and B arrays of 3×3 pixels, and arranged.

Further, the A arrays and the B arrays are alternately arranged in the horizontal and vertical directions as illustrated in FIG. 5, so that the G filters 34G at the four corners in the A array 35a and the B array 35b make up the G filters 34G of square arrays corresponding to 2×2 pixels.

This is because the G filters 34G which are brightness pixels are arranged at four corners and in the center of 3×3 pixels of the A array 35a or the B array 35b, and these 3×3 pixels are alternately arranged in the horizontal direction and the vertical direction to form the G filters 34G of the square arrays corresponding to 2×2 pixels. Note that by making this array, the above-mentioned features (1), (2) and (3), as well as the feature (5) described below are satisfied.

[Feature (5)]

The color filter array illustrated in FIG. 3 includes a square array 36 corresponding to 2×2 pixels provided with the G filters 34G (hereinafter simply referred to as G square array 36, see FIG. 6).

Figure 6:
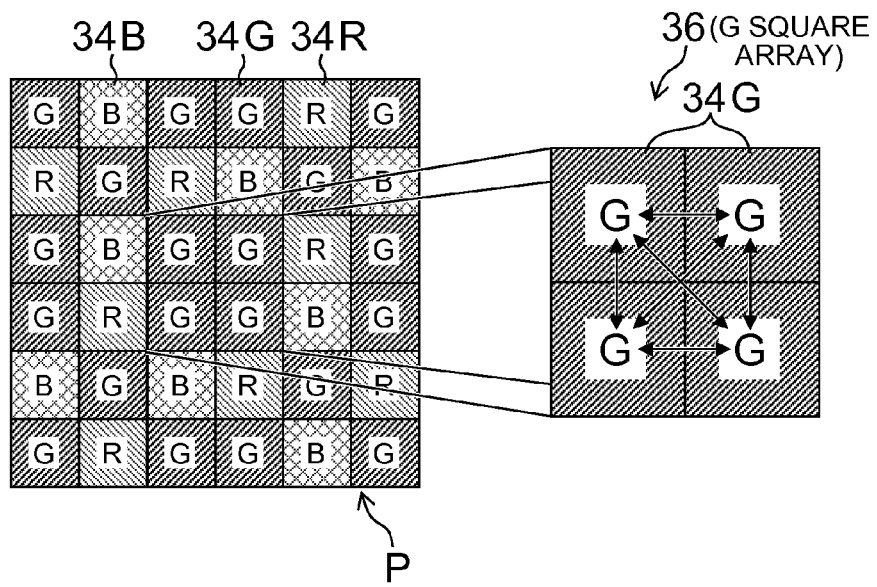
FIG. 6 is a view used to explain a method of determining a correlation direction from pixel values of G pixels of 2×2 pixels included in the color filter array of the color imaging element according to the first embodiment.

As illustrated in FIG. 6, by extracting 2×2 pixels provided with the G filters 34G, and calculating a differential absolute value of pixel values of G pixels in the horizontal direction, a differential absolute value of pixel values of G pixels in the vertical direction and a differential absolute value of pixel values of G pixels in the diagonal directions (diagonal upper right and diagonal lower right directions), it is possible to determine that there is a correlation in a direction of a small differential absolute value among the horizontal direction, the vertical direction and the diagonal directions.

That is, according to this color filter array, it is possible to determine a direction of a high correlation among the horizontal direction, the vertical direction and the diagonal directions using information of G pixels of a minimum pixel interval. This direction determination result can be used for processing of interpolating pixels from surrounding pixels (demosaicing processing). Consequently, the image processing circuit 22 can execute the demosaicing processing.

Further, as illustrated in FIG. 5, when pixels of the A array 35a or the B array 35b of 3×3 pixels are target pixels of the demosaicing processing, and 5×5 pixels (a local region of a mosaic image) are extracted around the A array 35a or the B array 35b, there are G pixels of 2×2 pixels at four corners of 5×5 pixels. By using these pixel values of G pixels of 2×2 pixels, it is possible to precisely determine a correlation direction of four directions using information of G pixels of a minimum pixel interval.

[Feature (6)]

The basic array pattern P of the color filter array illustrated in FIG. 3 is point-symmetric with respect to the center of the basic array pattern P (the center of the four G filters 34G). Further, as illustrated in FIG. 4, also the A array 35a and the B array 35b in the basic array pattern P are each point-symmetric with respect to the center G filters 34G.

This symmetry allows a circuit scale of a processing circuit at a subsequent stage to be miniaturized or simplified.

Figure 7:
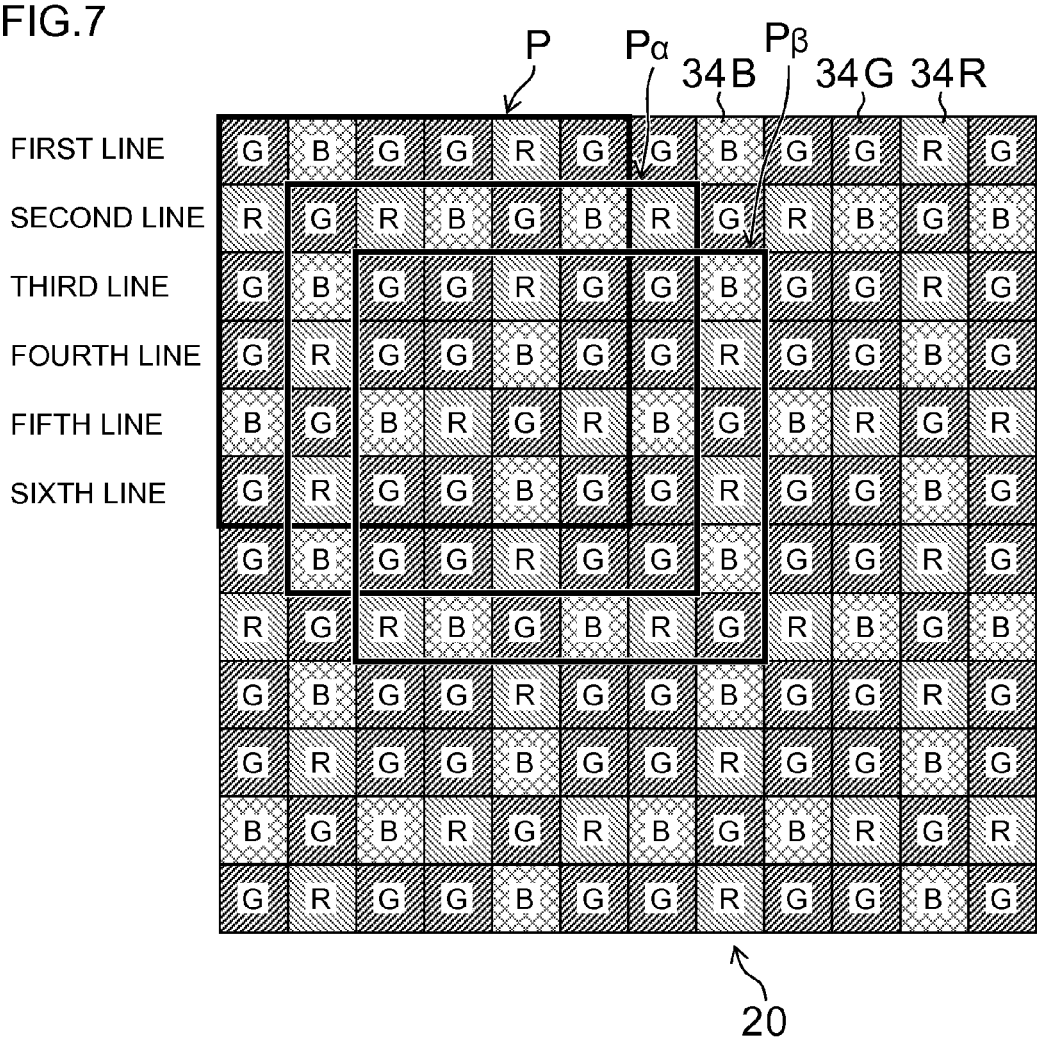
FIG. 7 is a view used to explain a concept of basic array patterns included in the color filter array of the color imaging element.

In the basic array pattern P indicated by a bold frame as illustrated in FIG. 7, color filter arrays in the first and third lines out of the first to sixth lines in the horizontal direction are GBGGRG, a color filter array of the second line is RGRBGB, color filter arrays of the fourth and sixth lines are GRGGBG, and a color filter array of the fifth line is BGBRGR.

Now, in FIG. 7, when a basic array pattern shifted by one pixel from the basic array pattern P in the horizontal direction and the vertical direction is Pα and a basic array pattern shifted by two pixels is Pβ, even if these basic array patterns Pα and Pβ are repeatedly arranged in the horizontal direction and the vertical direction, the same color filter array is provided.

That is, there are a plurality of basic array patterns which can form the color filter array illustrated in FIG. 7 by repeatedly arranging basic array patterns in the horizontal direction and the vertical direction. In the first embodiment, the basic array pattern P whose basic array pattern is point-symmetric is referred to as a basic array pattern for the sake of convenience.

Note that although color filter arrays according to other embodiments described below also include a plurality of basic array patterns for each color filter array, a representative one is referred to as a basic array pattern of the color filter array.

Entire Configuration of Digital Camera According to Second Embodiment

Figure 8:
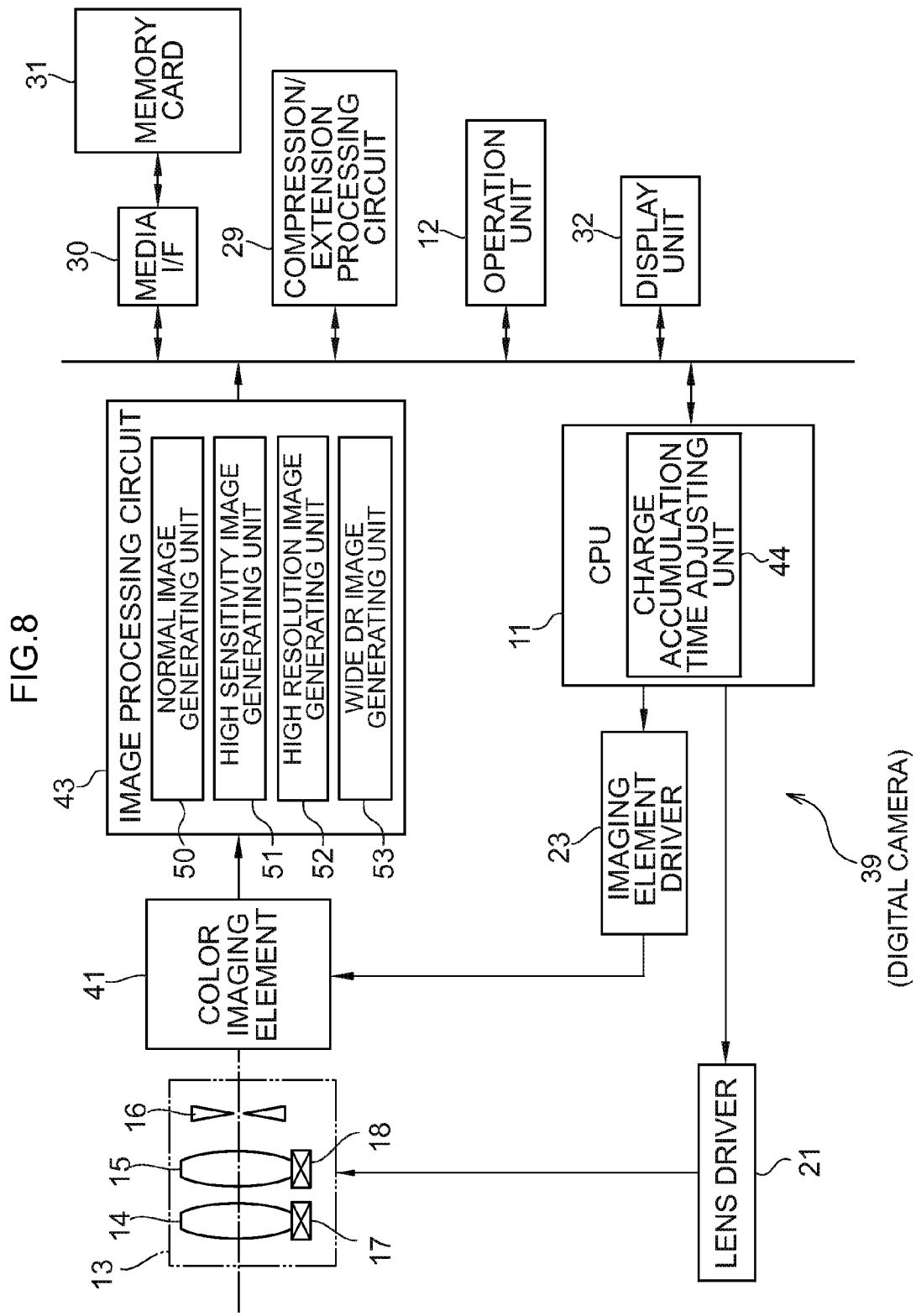
FIG. 8 is a view illustrating a digital camera of the second embodiment that has a single-plate color imaging element according to the present invention.

FIG. 8 is a block diagram of a digital camera (imaging apparatus) 39 of the second embodiment that has a color imaging element according to the present invention. Although the digital camera 10 which has one type of a shooting mode (normal shooting mode) has been described with the first embodiment, the digital camera 39 includes types of shooting modes.

In addition to the above-mentioned normal shooting mode, the digital camera 39 includes a high sensitivity image shooting mode for generating an image with little noise captured with a high sensitivity (referred to as a high sensitivity image below), a high resolution image shooting mode for generating an image of a higher resolution (a greater number of pixels) than a resolution of a normally-shot image (referred to as a high resolution image below), and a wide DR image shooting mode for generating an image whose dynamic range is expanded (enlarged) compared to a dynamic range of a normally-shot image (referred to as a wide DR image below). Each shooting mode is switched by the operation unit 12.

Note that the digital camera 39 employs basically the same configuration as the configuration according to the first embodiment except that the digital camera 39 has a color imaging element 41 and an image processing circuit 43 different from the digital camera 10 according to the first embodiment, and that the CPU 11 functions as a charge accumulation time adjusting unit (charge accumulation time adjusting device) 44. Consequently, the same function and configuration as the function and configuration according to the first embodiment are assigned the same reference numerals, and description thereof is omitted.

Color Imaging Element According to Second Embodiment

Figure 9:
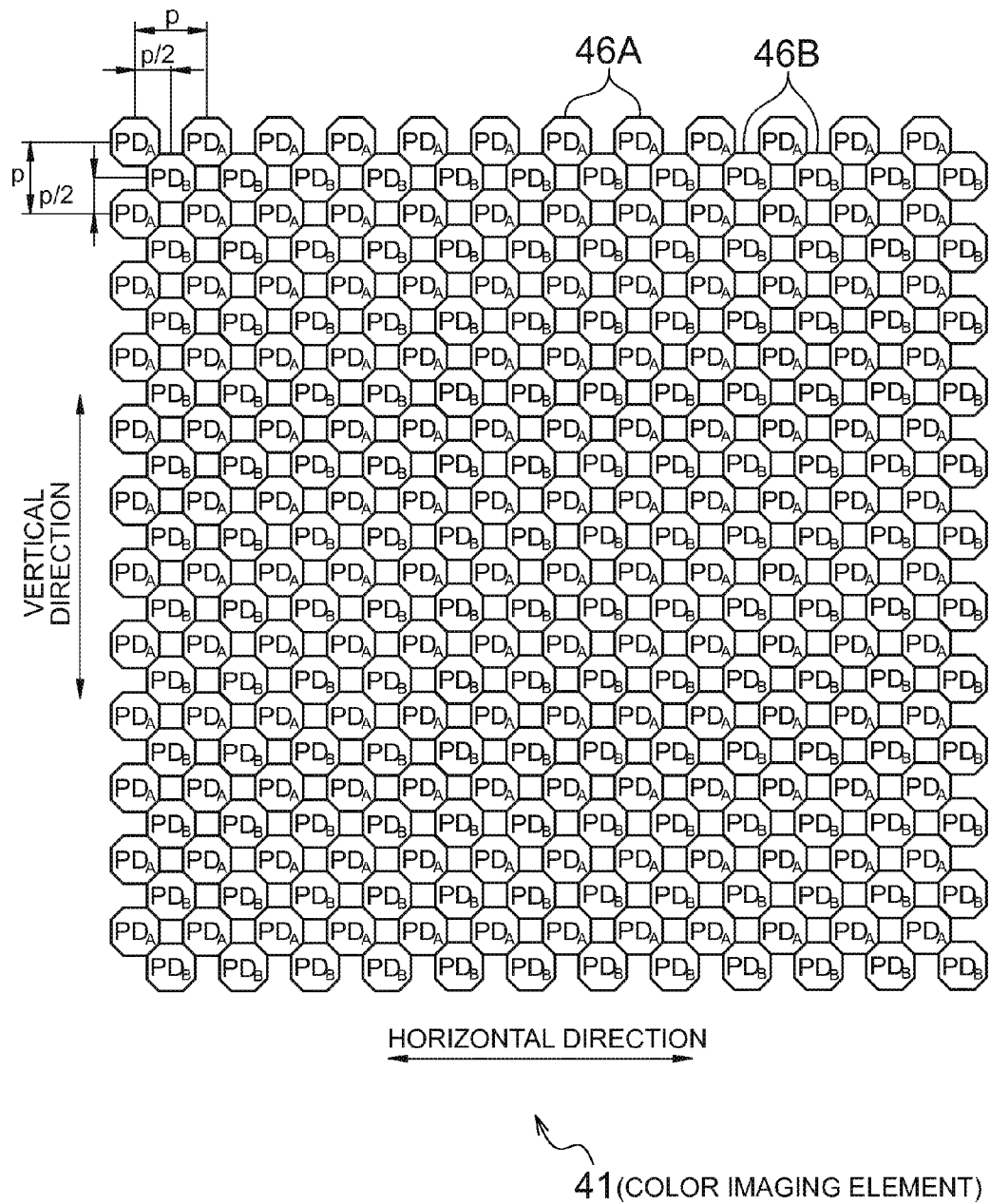
FIG. 9 is a view illustrating a pixel array of the color imaging element of the digital camera according to the second embodiment.

As illustrated in FIG. 9, first group pixels 46A and second group pixels 46B are provided on the imaging plane of the color imaging element 41. The first group pixels 46A are formed with photoelectric conversion elements $PD_A$ arrayed in a matrix pattern at a predetermined pixel interval p in each of the horizontal and vertical directions. Further, the second group pixels 46B are formed with photoelectric conversion elements $PD_B$ arrayed in a matrix pattern at the same pixel interval p as the pixel interval of the first group pixels 46A.

The first group pixels 46A (photoelectric conversion elements $PD_A$) are arrayed on odd-numbered pixel lines of the color imaging element 41. Meanwhile, the second group pixels 46B (photoelectric conversion elements $PD_B$) are arrayed on even-numbered pixel lines of the color imaging element 41. Further, each photoelectric conversion element $PD_B$ is arrayed at a position shifted ½ p (half the predetermined pixel interval) from each photoelectric conversion element $PD_A$ in each of the horizontal and vertical directions. Note that the photoelectric conversion elements $PD_A$ and $PD_B$ are basically the same except array positions. Of the imaging plane of the color imaging element 41, a region on which the first group pixels 46A are arrayed is referred to as an "A side" and a region on which the second group pixels 46B are arrayed is referred to as a "B side".

Output signals outputted from each of the first group pixels 46A and the second group pixels 46B are inputted to the image processing circuit 43.

Figure 10:
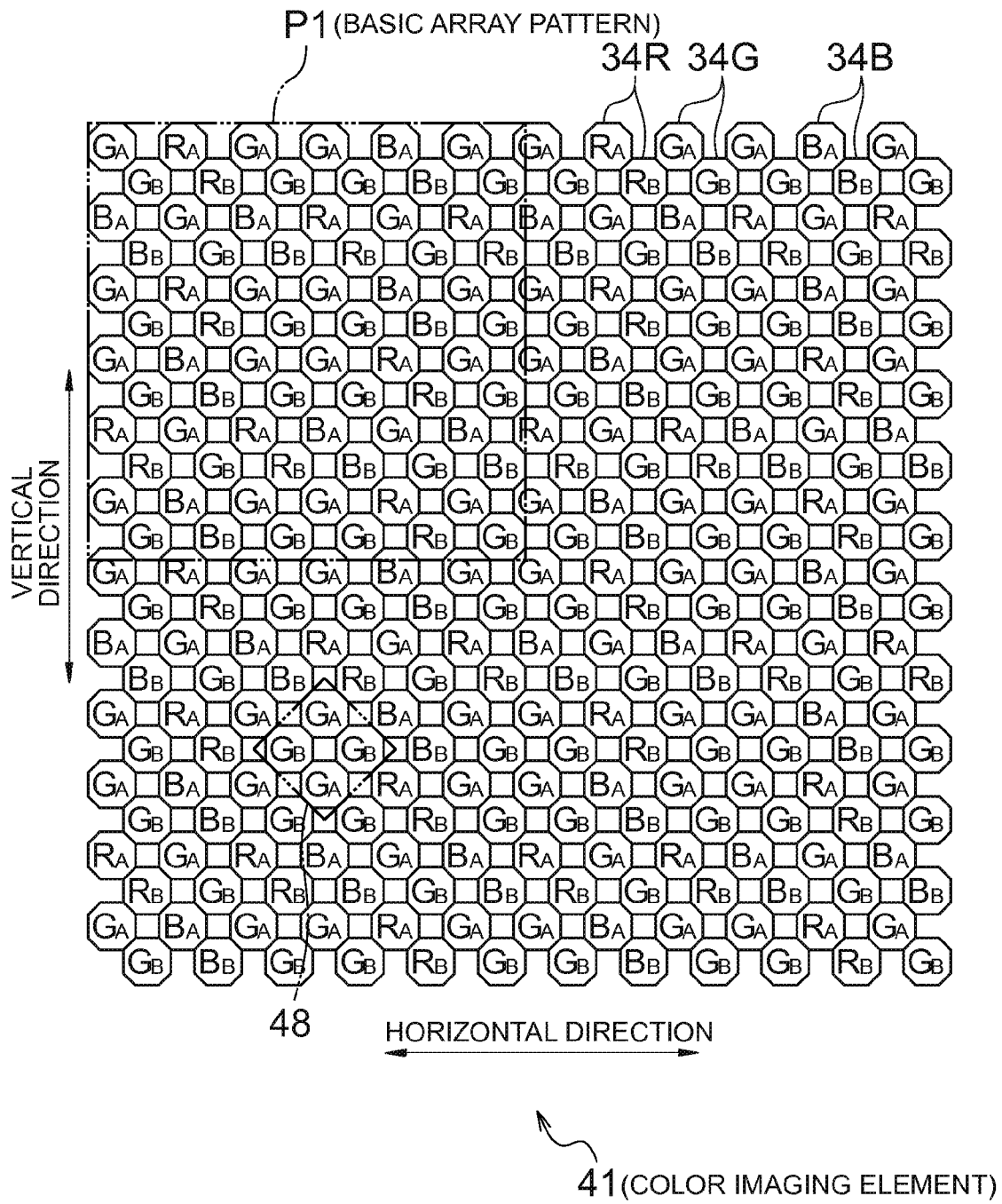
FIG. 10 is a view illustrating a color filter array of the color imaging element according to the second embodiment.

As illustrated in FIG. 10, R, G and B filters 34R, 34G and 34B are arrayed above the first group pixels 46A and the second group pixels 46B according to the same color filter array. Hence, the color filter array of the color imaging element 41 has an array pattern in which the same color filter arrays are arranged by being shifted ½ p in each of the horizontal and vertical directions (referred to as a special array pattern below).

Hereinafter, the R, G and B filters 34R, 34G and 34B on the A side are referred to as "$R_A$, $G_A$ and $B_A$ filters 34R, 34G and 34B", and the R, G and B filters 34R, 34G and 34B on the B side are referred to as "$R_B$, $G_B$ and $B_B$ filters 34R, 34G and 34B". Further, a color filter array of the $R_A$, $G_A$ and $B_A$ filters 34R, 34G and 34B on the A side is referred to as an "A side color filter array", and a color filter array of the $R_B$, $G_B$ and $B_B$ filters 34R, 34G and 34B on the B side is referred to as a "B side color filter array".

Figure 11:
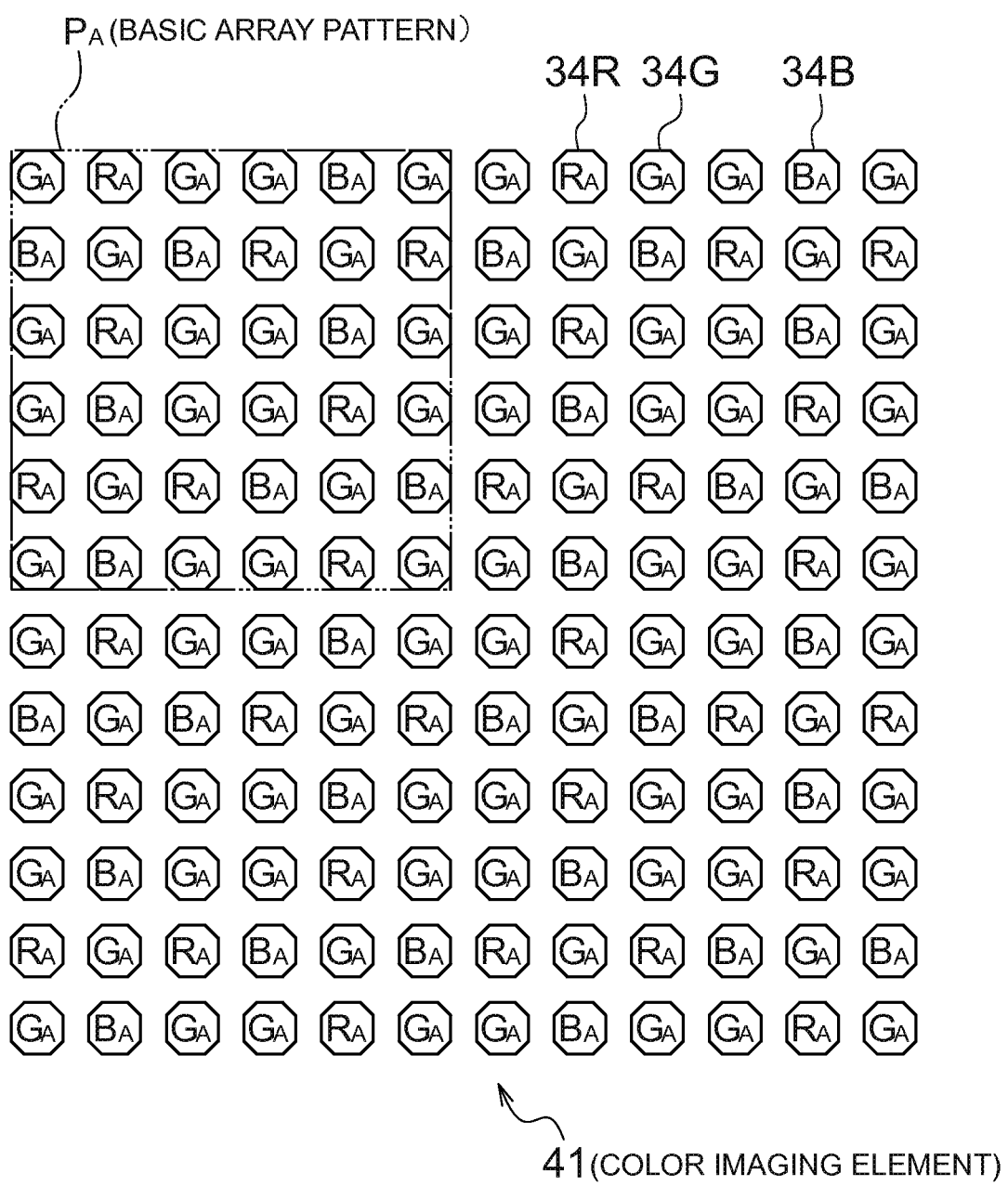
FIG. 11 is a view illustrating an A side color filter array of the color imaging element according to the second embodiment.
Figure 12:
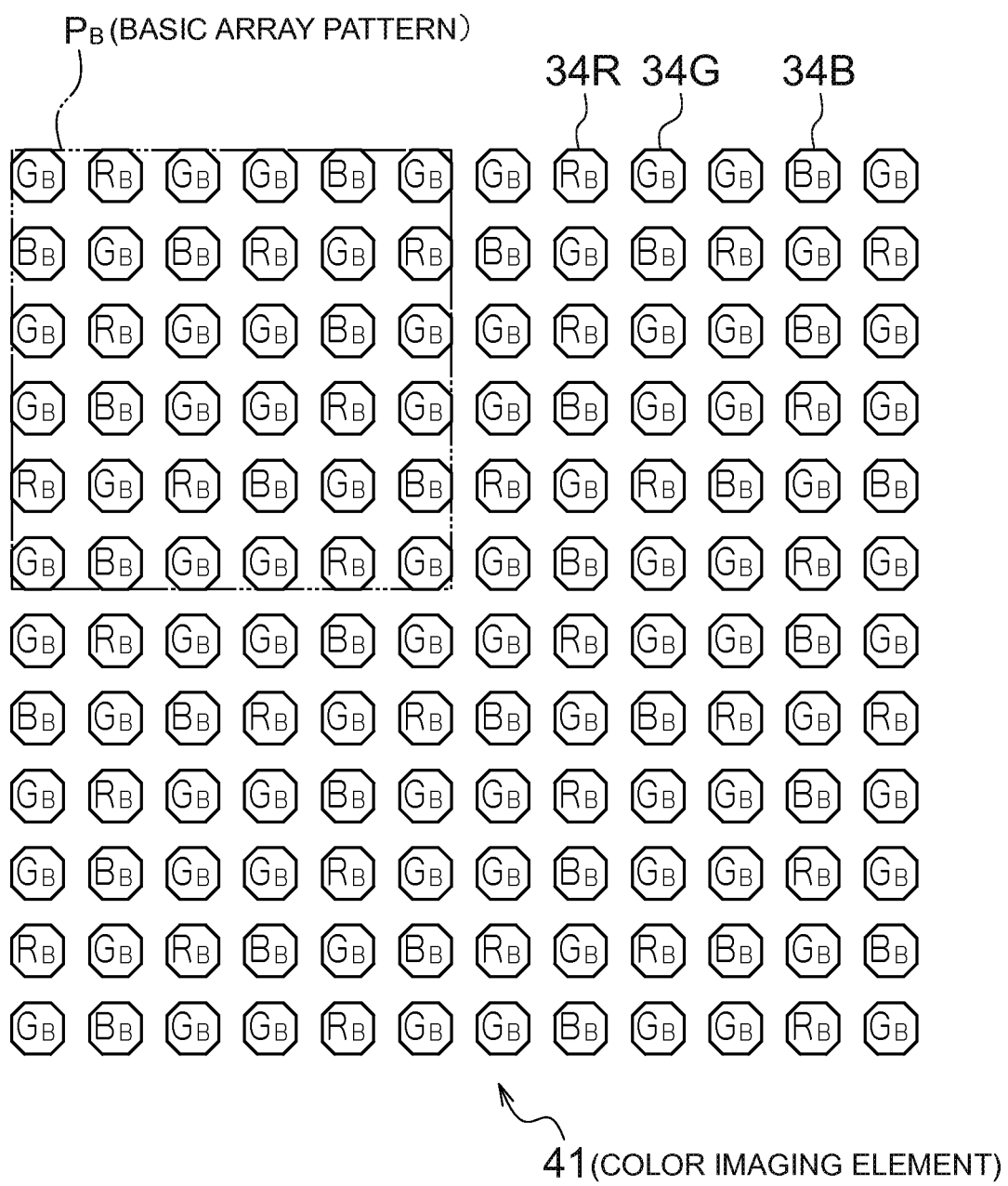
FIG. 12 is a view illustrating a B side color filter array of the color imaging element according to the second embodiment.

As illustrated in FIGS. 11 and 12, the A side color filter array and B side color filter array are each basically the same array as the color filter array according to the first embodiment. Hence, the A side color filter array includes the basic array pattern $P_A$ which is a square array pattern corresponding to 6×6 pixels, and the B side color filter array also includes the basic array pattern $P_B$ which is the same square array pattern. Further, in the A side and B side color filter arrays, the basic array patterns $P_A$ and the basic array patterns $P_B$ are respectively arranged repeatedly in the horizontal and vertical directions.

The basic array patterns $P_A$ and $P_B$ are basically the same array pattern as the basic array pattern P according to the first embodiment. Hence, as described in the first embodiment, the A side and B side color filter arrays each include the above-mentioned features (1), (2), (3), (4), (5) and (6).

Back to FIG. 10, the color filter array of the color imaging element 41 is formed with the A side color filter array and the B side color filter array. The A side and B side color filter arrays include the above-mentioned features (2) and (3), and the color filter array of the color imaging element 41 also includes the above-mentioned features (2) and (3) likewise.

Further, the A side and B side color filter arrays are formed by repeatedly arranging the basic array patterns $P_A$ and $P_B$, respectively, in the horizontal direction and the vertical direction. Hence, the color filter array of the color imaging element 41 includes the basic array pattern P1, and is formed by repeatedly arranging the basic array pattern P1 in the horizontal direction and the vertical direction. Hence, the color filter array of the color imaging element 41 also includes the above-mentioned feature (1).

Figure 13:
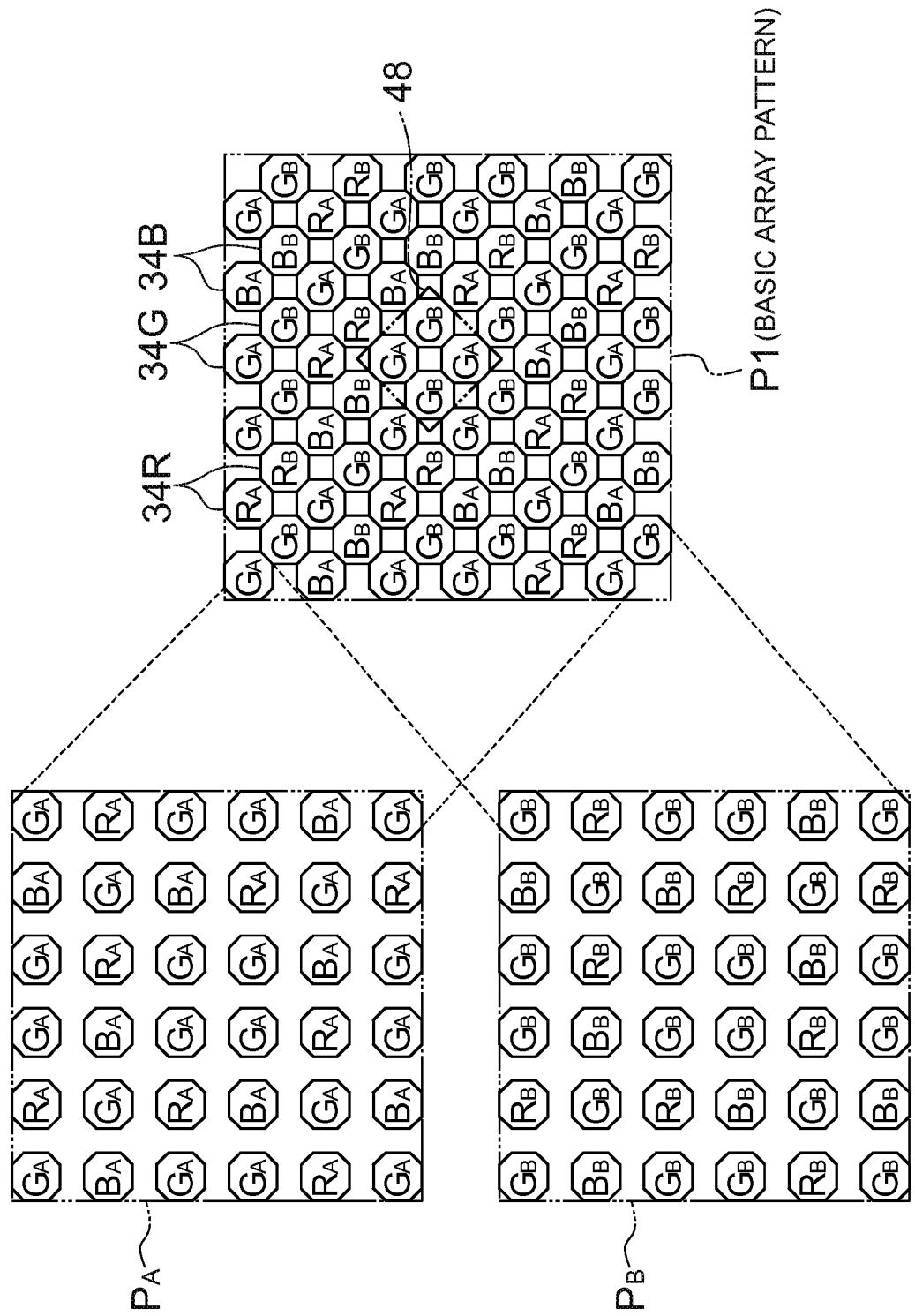
FIG. 13 is a view illustrating basic array patterns included in the color filter array of the color imaging element according to the second embodiment.

As illustrated in FIG. 13, the basic array pattern P1 is formed with the basic array pattern $P_A$ and the basic array pattern $P_B$ at a position shifted ½ p from the basic array pattern $P_A$ in the horizontal and vertical directions. The A side and B side color filter arrays include the above-mentioned feature (4), and the color filter array of the color imaging element 41 also includes the above-mentioned feature (4) likewise.

Note that in the second embodiment, the basic array pattern P1 is not point-symmetric with respect to its center.

As described above, the color filter array of the color imaging element 41 includes the same features as the features (1), (2), (3) and (4) of the color filter array according to the first embodiment.

[Feature (7)]

Further, one or more of each of the $R_{A,B}$ filters 34R, the $G_{A,B}$ filters 34G and the $B_{A,B}$ filters 34B are arranged on each filter line in diagonal (NE, NW) directions (except part of lines) of the color filter array of the color imaging element 41. Hence, resolutions in the diagonal (NW, NW) directions become higher.

Figure 14:
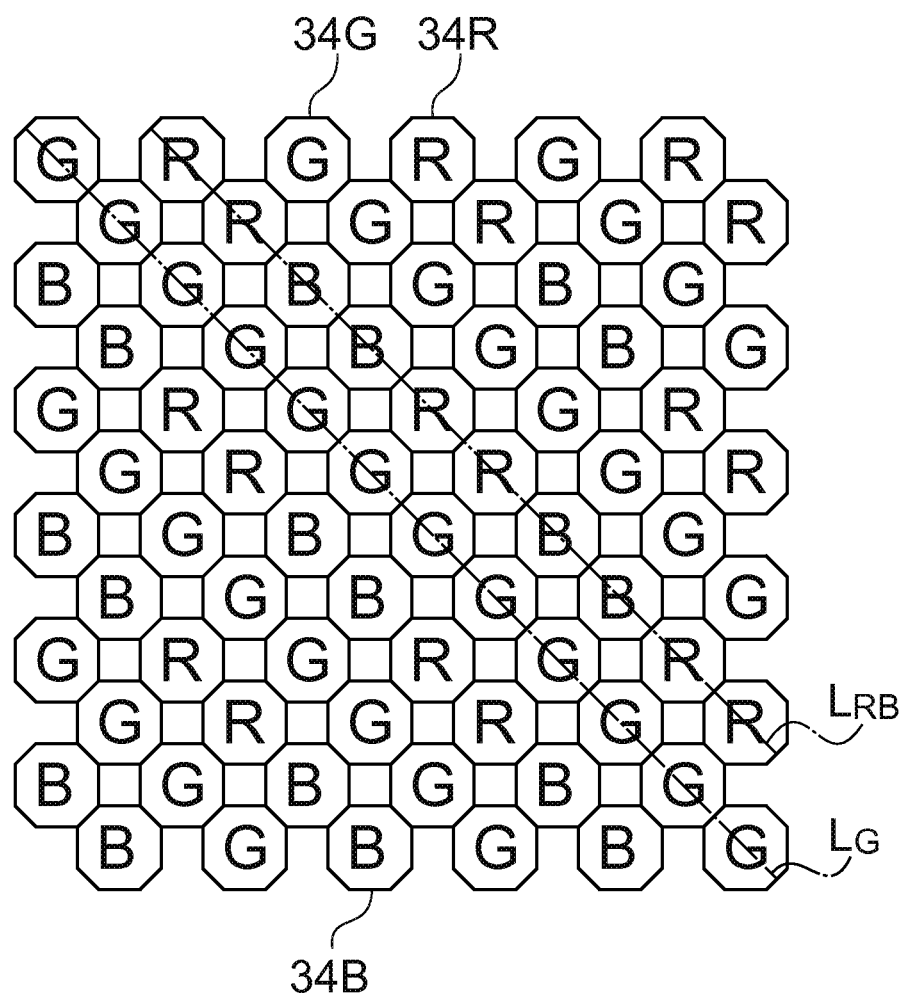
FIG. 14 is a view illustrating a conventional color filter array which needs optical low pass filters to be arranged.

Meanwhile, as illustrated in FIG. 14 which illustrates a comparative example, when the A side and B side array patterns are respectively Bayer arrays even though the color filter array includes the same "special array pattern" as the special array pattern according to the second embodiment, the resolution in the diagonal (NE) direction lowers. Specifically, the color filter array adopts a pattern in which lines $L_G$ having only the G filters 34G in the diagonal (NW) direction and lines $L_{RB}$ having only the R and B filters 34R and 34B in the diagonal (NW) direction are alternately arranged in the diagonal (NE) direction, and therefore, for example, pixel intervals between the G filters 34G in the diagonal (NE) direction become wider than pixel intervals in the horizontal and vertical directions. Note that the same also applies to the R and B filters 34R and 34B. Hence, the resolution of the color filter array in the diagonal (NE) direction lowers, and therefore it is preferable that an optical low pass filter having anisotropy in the diagonal (NE) direction is additionally provided.

By contrast with this, the resolution of the color filter array of the color imaging element 41 in the diagonal (NE, NW) directions is higher, so that it is possible to suppress color moire (false color) generated by an input image having a high frequency component in the diagonal directions without arranging the optical low pass filter having anisotropy in the diagonal (NE) direction.

[Feature (5')]

Further, instead of the G square array 36 according to the first embodiment, the color filter array of the color imaging element 41 includes a G array 48 in which four $G_A$ and $G_B$ filters 34G are arranged at minimum intervals in the horizontal, vertical and diagonal directions (see FIGS. 10 and 13). Consequently, by extracting 4 pixels on which the G array 48 is provided and calculating a differential absolute value of pixel values of the G pixels in the horizontal direction, a differential absolute value of pixel values of the G pixels in the vertical direction and a differential absolute value of pixel values of the G pixels in the diagonal directions (NE, NW), it is possible to determine that there is a correlation in a direction of a small differential absolute value. Consequently, the color filter array of the color imaging element 41 includes substantially the same feature as the above-mentioned feature (5).

Each Configuration of Digital Camera According to Second Embodiment

The charge accumulation time adjusting unit 44 (see FIG. 8) independently controls charge accumulation times (exposure times) of the first group pixels 46A (A side) and the second group pixels 46B (B side). The charge accumulation time adjusting unit 44 sets the charge accumulation times for the first group pixels 46A and the second group pixels 46B to be the same upon the shooing modes other than the wide DR image shooting mode.

Figure 15:
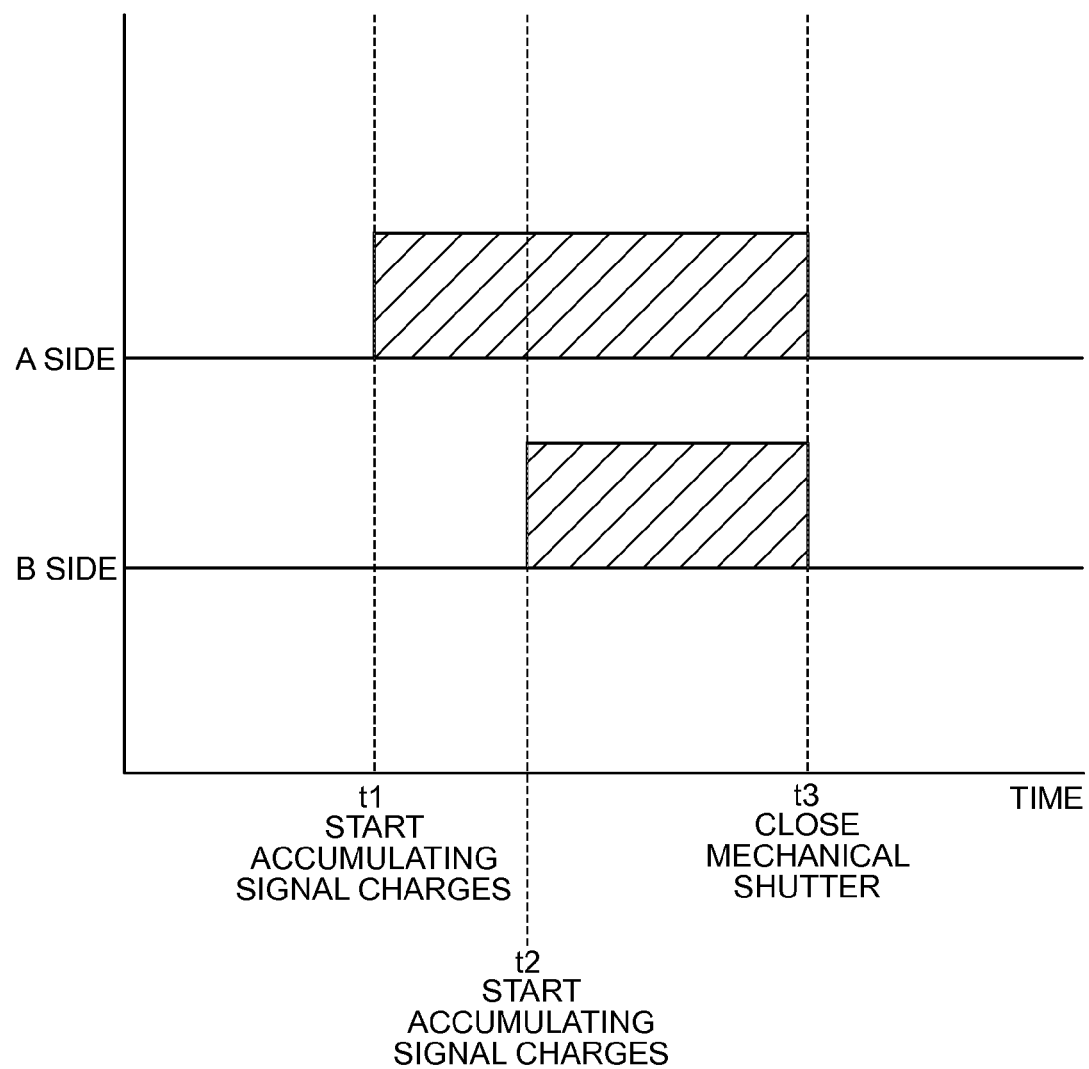
FIG. 15 is an explanatory view for explaining control of the color imaging element according to the second embodiment upon a wide DR image shooting mode.

Further, as illustrated in FIG. 15, the charge accumulation time adjusting unit 44 sets a shorter charge accumulation time for the second group pixels 46B than the charge accumulation time for the first group pixels 46A upon the wide DR image shooting mode (or vice versa). Consequently, the first group pixels 46A become relatively "high sensitivity pixels", and the second group pixels 46B become relatively "low sensitivity pixels". As a result, it is possible to acquire an image of high sensitivity (referred to as a high sensitivity image below) from the first group pixel 46A, and acquire an image of low sensitivity (referred to as a low sensitivity image below) from the second group pixels 46B.

Back to FIG. 8, although the image processing circuit 43 is basically the same as the image processing circuit 22 according to the first embodiment, the image processing circuit 43 generates normally-shot image data upon the normal shooting mode, generates high sensitivity image data upon the high sensitivity image shooting mode, generates high resolution image data upon the high resolution image shooting mode, and generates wide DR image data upon the wide DR image shooting mode. The image processing circuit 43 has a normal image generating unit 50, a high sensitivity image generating unit (first image generating device) 51, a high resolution image generating unit (second image generating device) 52 and a wide DR image generating unit (third image generating device) 53.

The normal image generating unit 50 generates normally-shot image data based on, for example, output signals outputted from the first group pixels 46A (or maybe second group pixels 46B) upon the normal shooting mode.

Figure 16:
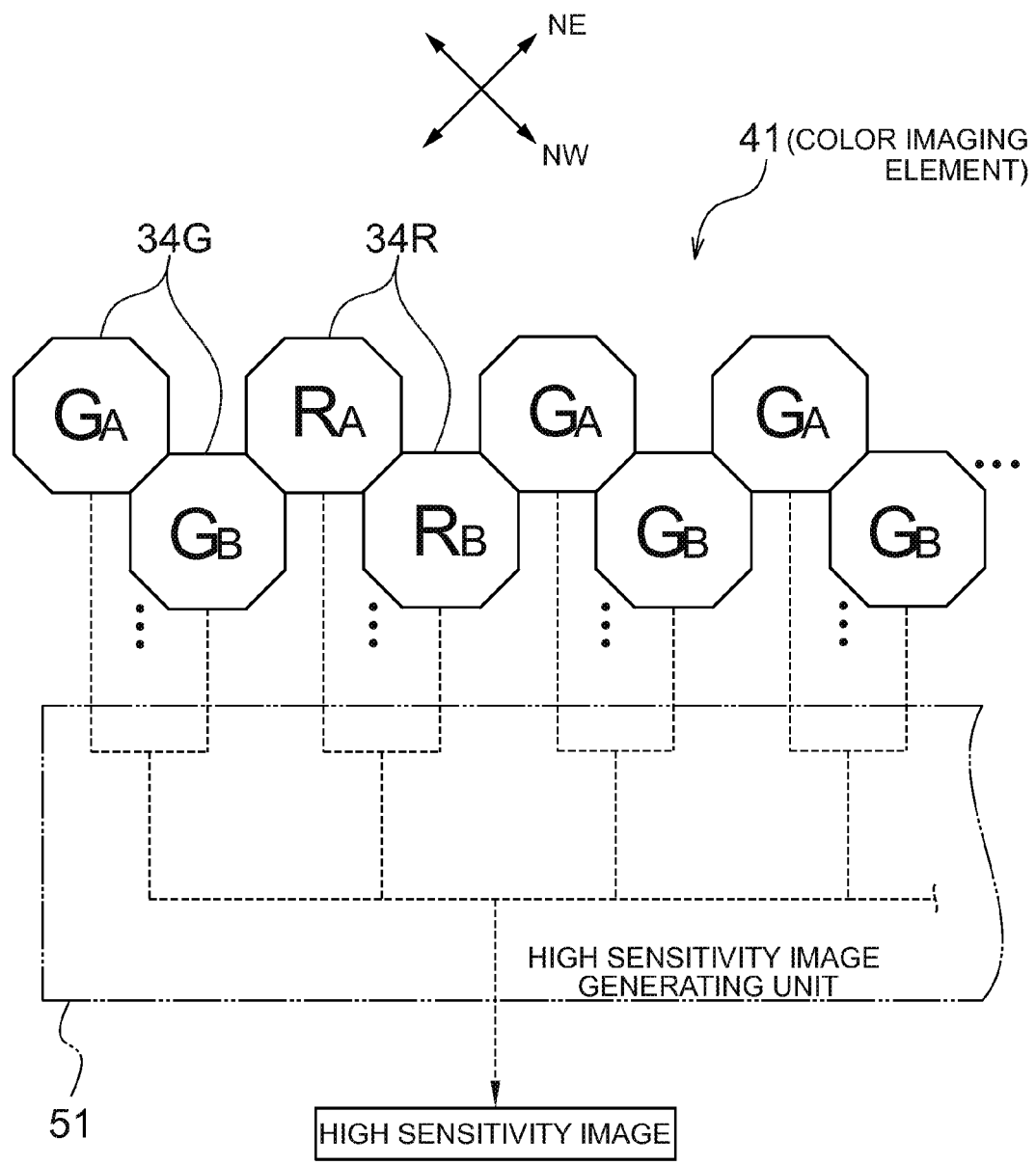
FIG. 16 is a view for explaining high sensitivity image data generation processing performed by a high sensitivity image generating unit.
Figure 17:
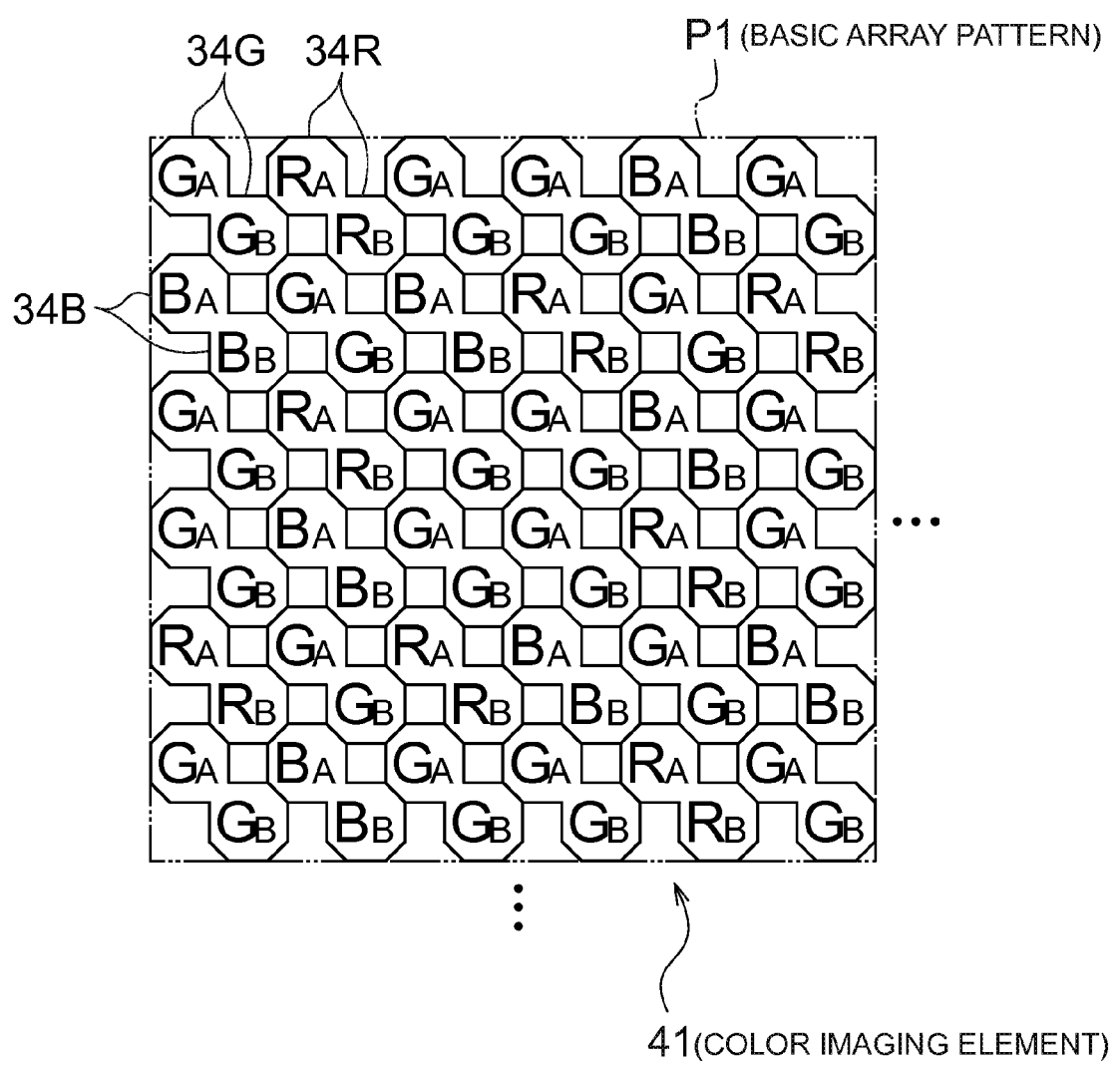
FIG. 17 is an explanatory view for explaining high sensitivity image data generation processing (pixel mixing).

As illustrated in FIG. 16, the high sensitivity image generating unit 51 performs so-called pixel mixing, in which it mixes (adds) output signals from the first group pixels 46A and output signals from the second group pixels 46B that have the same color and are mutually adjacent in the diagonal direction (the NW direction according to the present embodiment) upon the high sensitivity image shooting mod. Consequently, as illustrated in FIG. 17, it is possible to perform signal processing by regarding the first group and second group pixels 46A and 46B of the same color which are adjacent in the diagonal direction (NW) as one pixel. The sensitivity becomes about doubled as a result of such pixel mixing, so that it is possible to acquire high sensitivity image data. This high sensitivity image data can be acquired without performing gain-up, so that noise also decreases. Note that even when the first group pixels 46A and the second group pixels 46B are adjacent in the diagonal direction (NE), although not illustrated, it is possible to acquire high sensitivity image data likewise.

Figure 18:
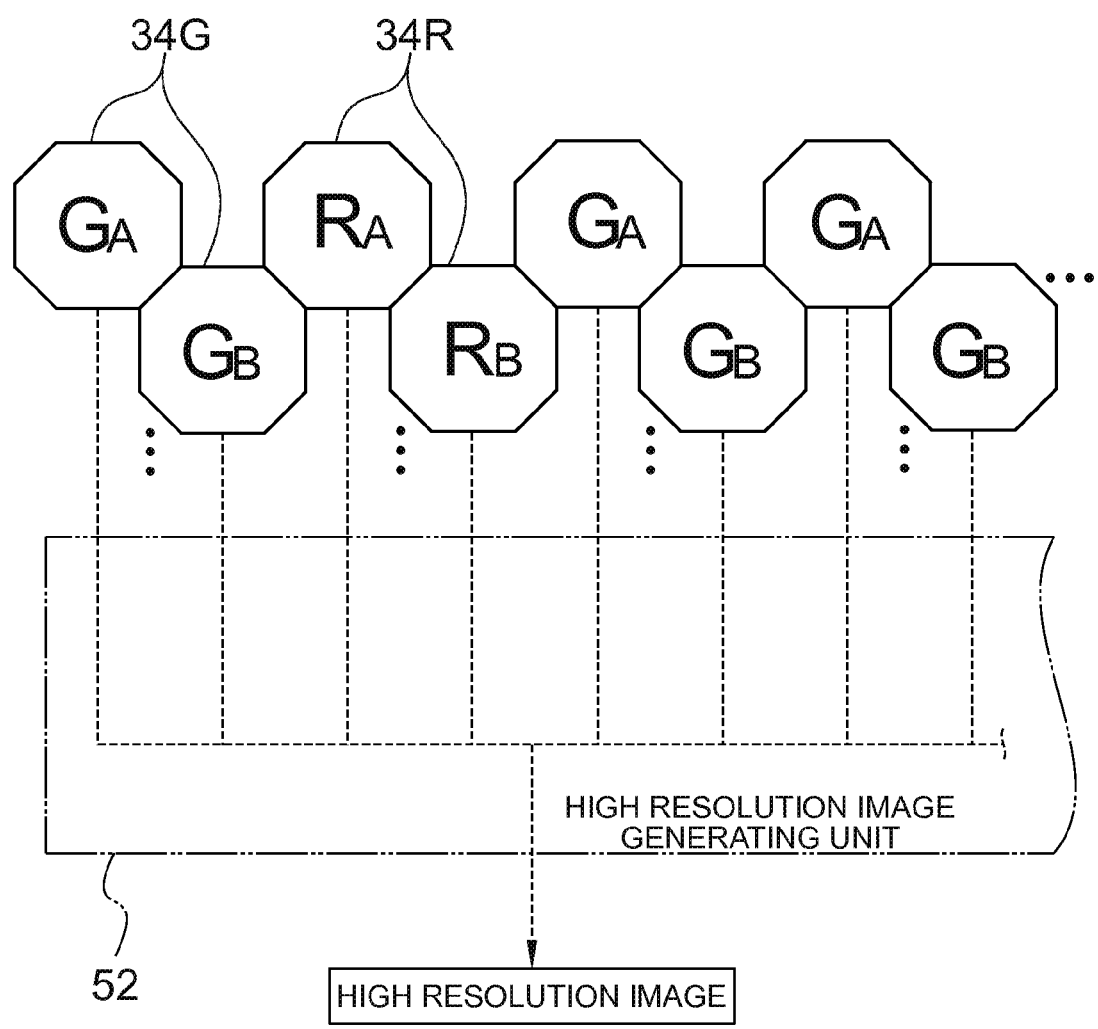
FIG. 18 is a view for explaining high resolution image data generation processing performed by a high resolution image generating unit.

As illustrated in FIG. 18, the high resolution image generating unit 52 generates high resolution image data based on output signals outputted from both of the first group pixels 46A and the second group pixels 46B upon the high resolution image shooting mode. High resolution image data is generated using double pixels compared to generation of normally-shot image data, so that image data has a higher resolution than the resolution of the normally-shot image data.

Figure 19:
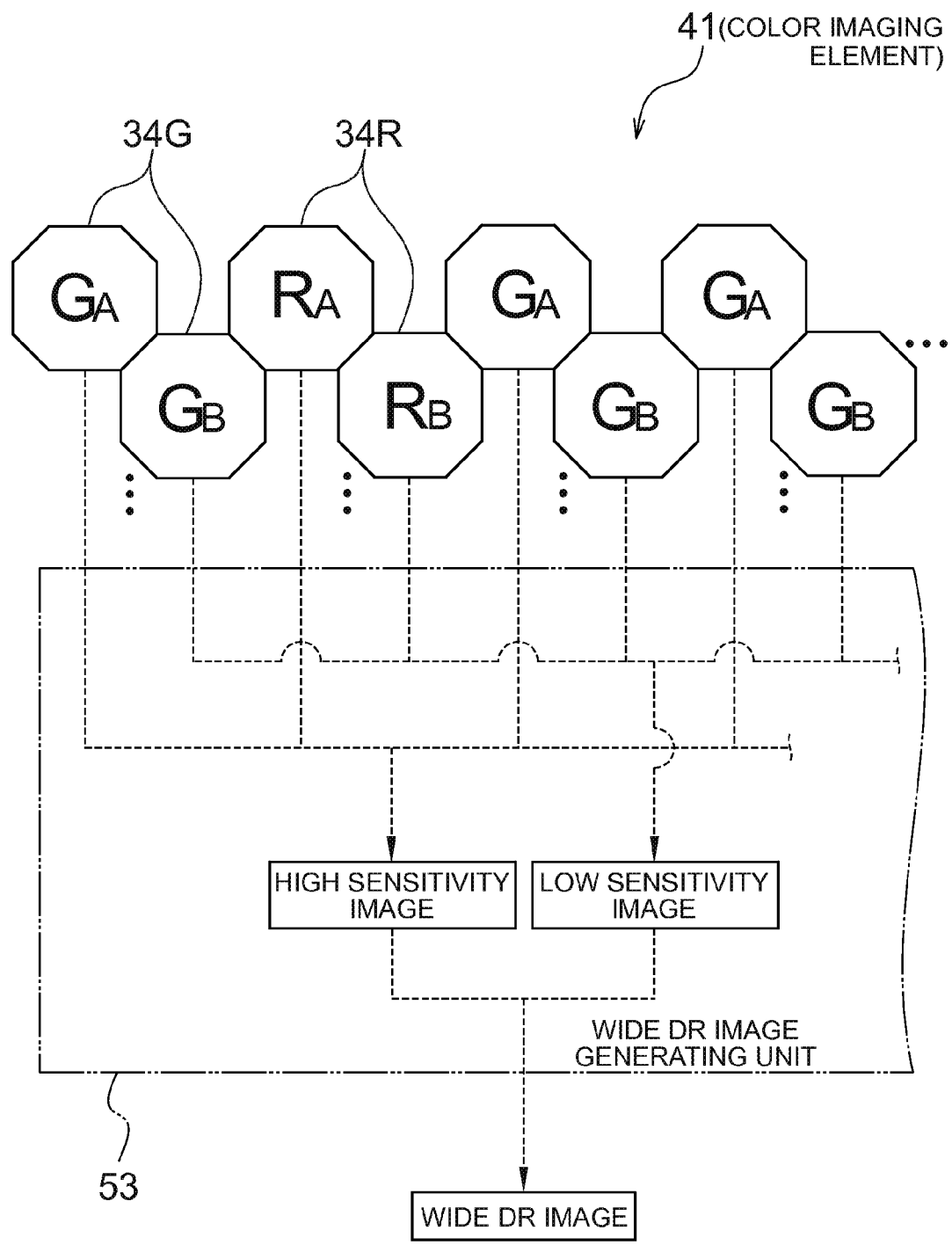
FIG. 19 is a view for explaining wide DR image data generation processing performed by a wide DR image generating unit.

As illustrated in FIG. 19, the wide DR image generating unit 53 generates high sensitivity image data and low sensitivity image data based on an output signal from each of the first group and second group pixels 46A and 46B of different signal charge accumulation times upon the wide DR image shooting mode. Then, the wide DR image generating unit 53 generates wide DR image data based on the high sensitivity image data and the low sensitivity image data. Note that a method of generating wide DR image data using image data of different sensitivity is a known technique, and therefore is not specifically described.

Actions of Digital Camera According to Second Embodiment

Figure 20:
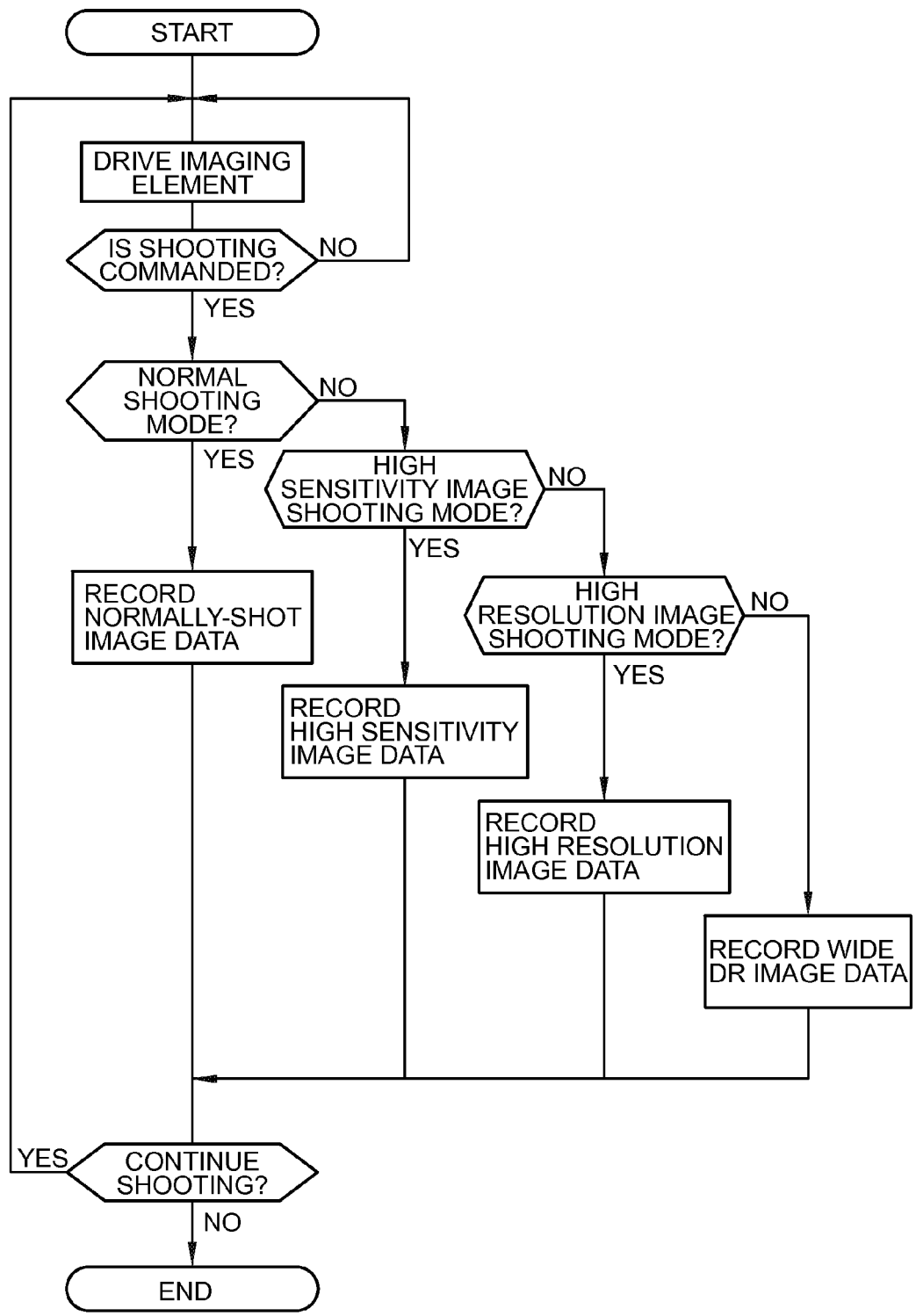
FIG. 20 is a view for explaining actions of the digital camera according to the second embodiment.

Next, actions of the digital camera 39 employing the above-mentioned configuration are described with reference to FIG. 20. When the operation unit 12 sets the shooting mode to one of the normal shooting mode, the high sensitivity image shooting mode, the high resolution image shooting mode and the wide DR image shooting mode, the CPU 11 controls an operation of the mechanical shutter 16 through the lens driver 21 and drives the color imaging elements 41 through the imaging element driver 23.

The mechanical shutter 16 is opened and closed at a predetermined shutter speed, and a signal charge is accumulated in each of the pixels 46A and 46B of the color imaging elements 41. In this regard, the charge accumulation time adjusting unit 44 adjusts charge accumulation times of the first group pixels 46A and the second group pixels 46B to be the same upon the shooting mode other than the wide DR image shooting mode, and makes both charge accumulation times different upon the wide DR image shooting mode. Further, the output signal of each of the pixels 46A and 46B is outputted to the image processing circuit 43 under control of the imaging element driver 23.

[Normal Shooting Mode]

When the shooting mode is set to the normal shooting mode, the normal image generating unit 50 operates. The normal image generating unit 50 generates normally-shot image data based on the output signals from the first group pixels 46A, and outputs the output signals to the display unit 32 at a certain timing. Consequently, a through image is displayed on the display unit 32. Further, shooting preparation processing such as AF processing and AE processing is simultaneously performed.

When the operation unit 12 commands shooting, the normal image generating unit 50 generates normally-shot image data of one frame. This normally-shot image data is compressed by the compression/extension processing circuit 29, and then is recorded in the memory card 31 through the media I/F 30.

[High Sensitivity Image, High Resolution Image and Wide DR Image Shooting Mode]

When the shooting mode is set to the high sensitivity image shooting mode, the high sensitivity image generating unit 51 operates, and generates high sensitivity image data by performing so-called pixel mixing as illustrated in FIG. 16. Further, when the shooting mode is set to the high resolution image shooting mode, the high resolution image generating unit 52 operates, and generates high resolution image data based on output signals from all pixels 46A and 46B as illustrated in FIG. 18.

Furthermore, when the shooting mode is set to the wide DR image shooting mode, the wide DR image generating unit 53 operates, and generates wide DR image data based on high sensitivity and low sensitivity image data configured by an output signal from each of all pixels 46A and 46B as illustrated in FIG. 19. Subsequently, similar to the normal shooting mode, when the operation unit 12 commands shooting, the high sensitivity image data, the high resolution image data and the wide DR image data are subjected to compression processing and then recorded in the memory card 31.

The color imaging element 41 includes the color filter array illustrated in FIG. 10 or the like, so that it is possible to prevent generation of color moire (false color) in all of normally-shot image data, high sensitivity image data, high resolution image data and wide DR image data, and acquire image data of high image quality. Further, it is possible to prevent an optical low pass filter from being arranged, and apply an optical low pass filter whose function of cutting a high frequency component is weak and, consequently, prevent the resolution from lowering. Consequently, it is possible to acquire image data of high resolution. Further, the color filter array is formed by repeatedly arranging the basic array pattern P1 in the horizontal direction and the vertical direction, so that it is possible to perform processing according to a repetition pattern when performing demosaicing processing at a subsequent stage such as an image processing circuit, and simplify processing at the subsequent stage compared to a conventional random array.

Entire Configuration of Digital Camera According to Third Embodiment

Figure 21:
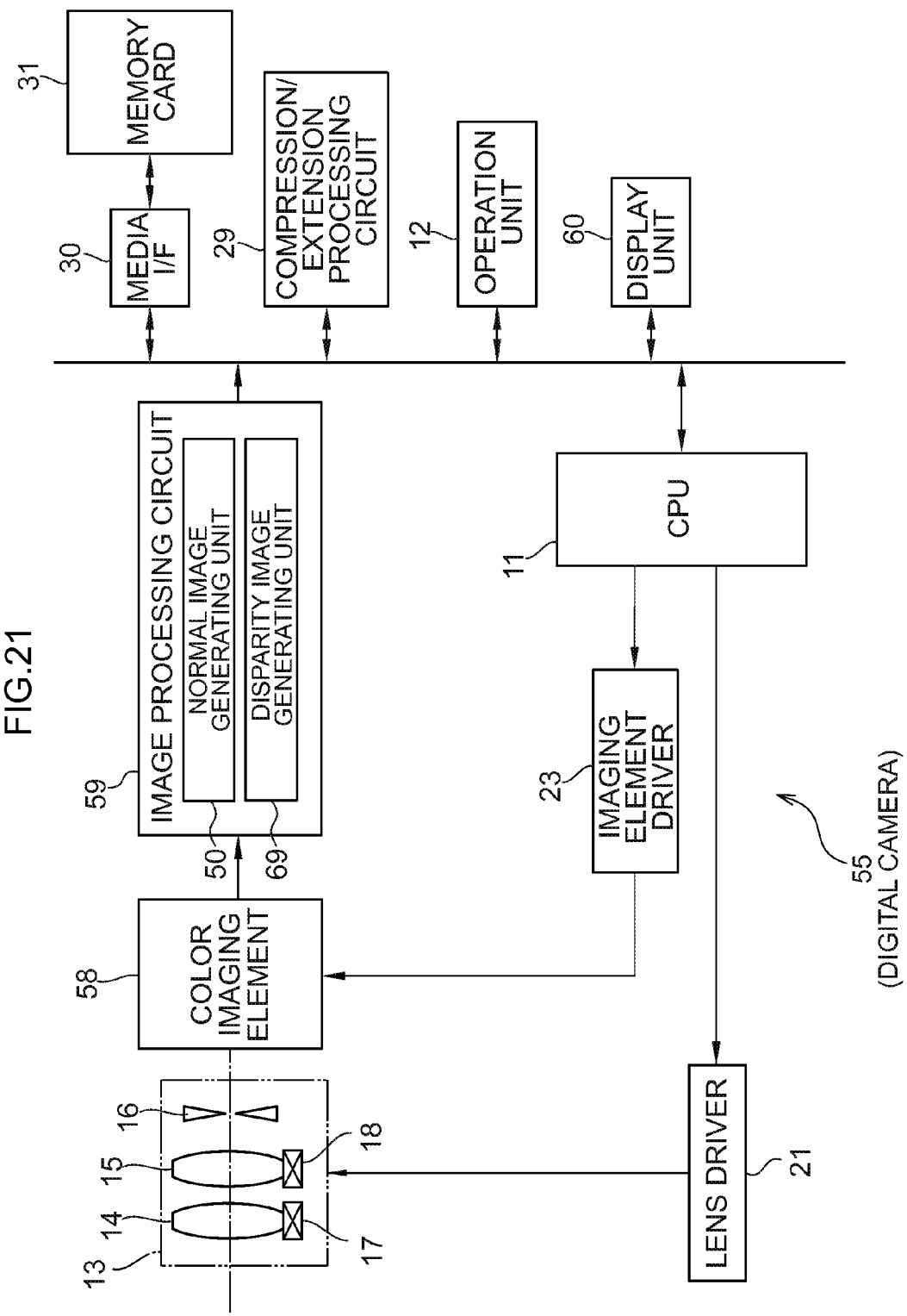
FIG. 21 is a view illustrating a digital camera of the third embodiment that has a single-plate color imaging element according to the present invention.

FIG. 21 is a block diagram of a digital camera (imaging apparatus) 55 of the third embodiment that has a color imaging element according to the present invention. Although the digital camera 39 which can generate high sensitivity images, high resolution images and wide DR images has been described in the above-mentioned second embodiment, the digital camera 55 generates stereoscopic disparity images.

The digital camera 55 includes a 3D shooting mode for generating disparity images instead of the above-mentioned high sensitivity image shooting mode, high resolution image shooting mode and wide DR image shooting mode. Further, the digital camera 55 employs basically the same configuration as the configuration according to the second embodiment except that the digital camera 55 has a color imaging element 58, an image processing circuit 59 and a display unit 60 that are different from the digital camera 39 according to the second embodiment, and the same function and configuration as the function and the configuration according to the second embodiment are assigned the same reference numerals and the description thereof is omitted.

Color Imaging Element According to Third Embodiment

Figure 22:
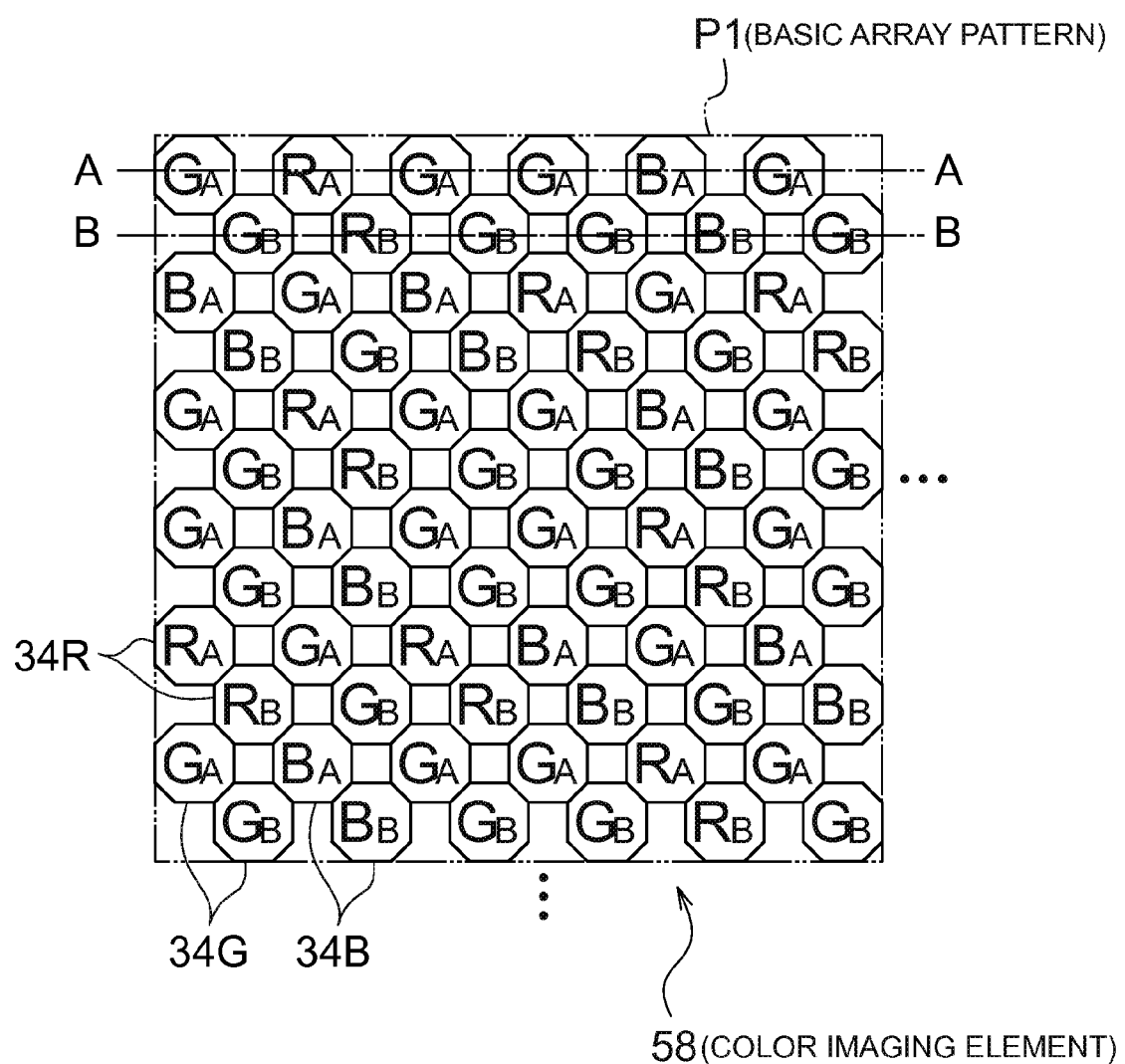
FIG. 22 is a view illustrating a color filter array of the color imaging element according to the third embodiment.

As illustrated in FIG. 22, a pixel array and a color filter array of the color imaging element 58 are the same as the pixel array and the color filter array of the color imaging element 41 according to the second embodiment. Meanwhile, the color imaging element 58 is configured such that the first group pixels 46A and the second group pixels 46B are highly sensitive to subject lights incident from different directions.

Figure 23:
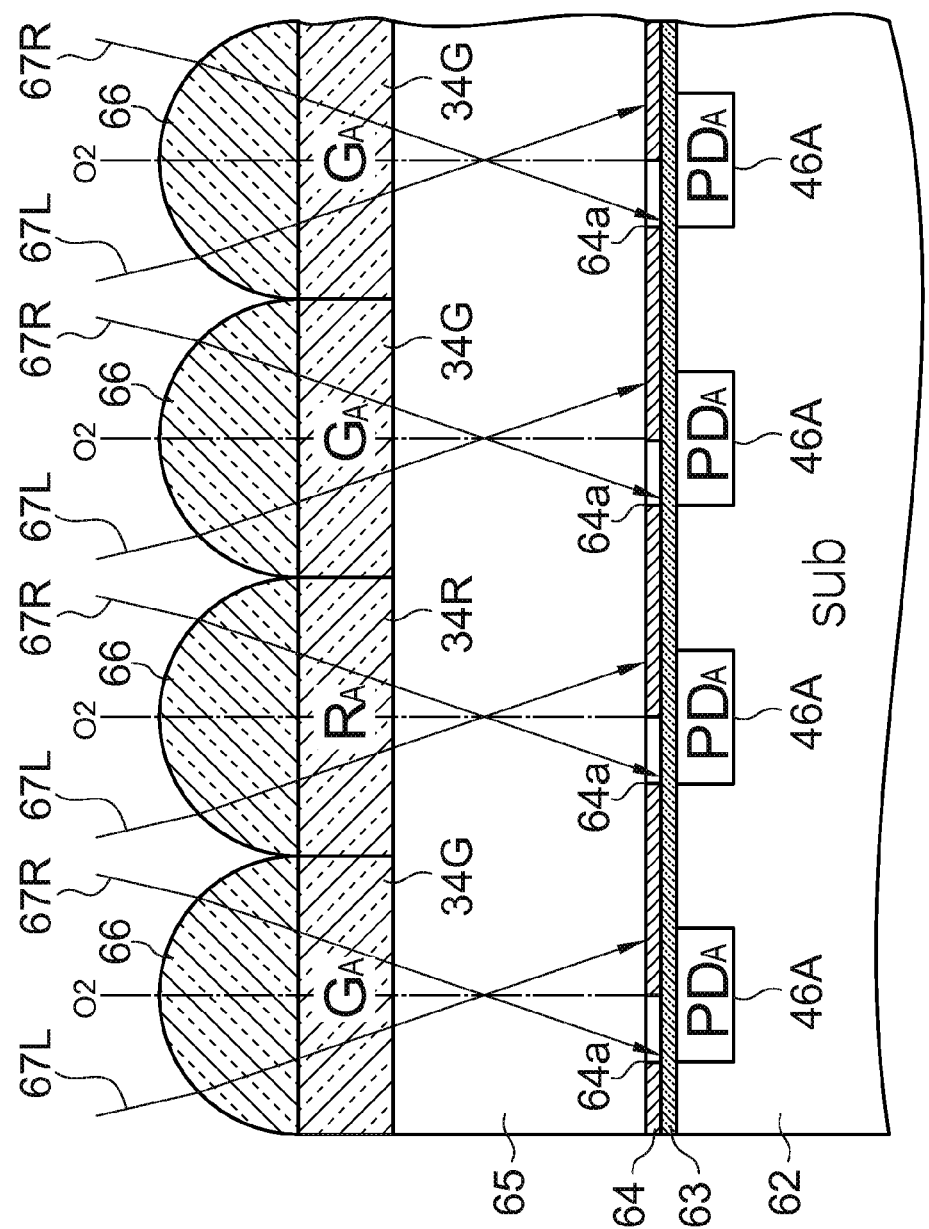
FIG. 23 is a view illustrating a cross section along an AA line in FIG. 22.
Figure 24:
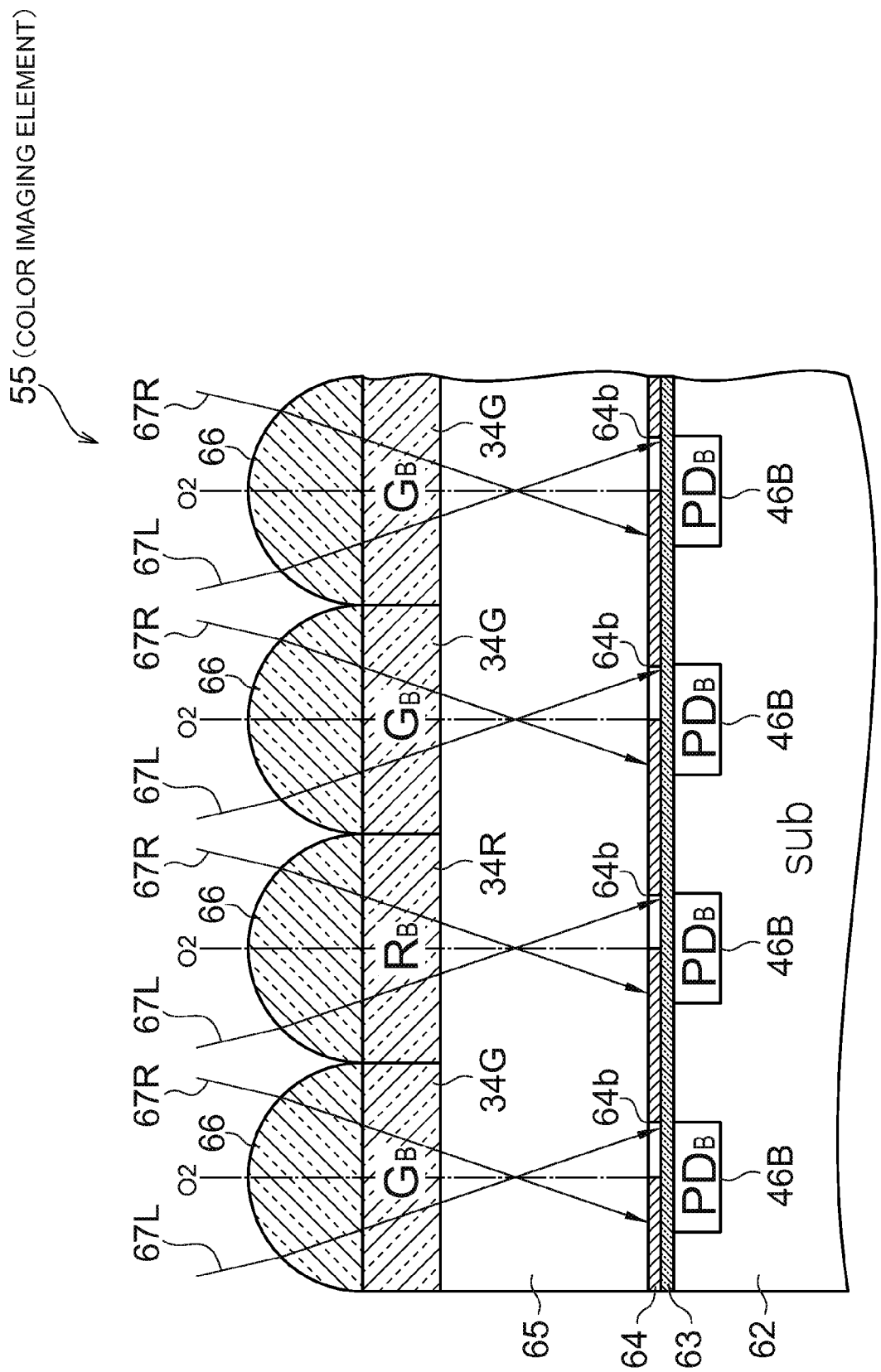
FIG. 24 is a view illustrating a cross section along a BB line in FIG. 22.

In FIG. 23 illustrating a cross section along an AA line in FIG. 22 and FIG. 24 illustrating a cross section along a BB line, the photoelectric conversion elements $PD_A$ and $PD_B$ which form the pixels 46A and 46B, respectively, are formed in a surface layer of a semiconductor substrate (sub) 62. Note that various circuits which are used to drive each of the pixels 46 and 46B and output signals are provided in the semiconductor substrate 62, although not illustrated.

A light transmissive insulation film 63 made of, for example, oxide silicon is provided on the semiconductor substrate 62. A light blocking film 64 made of, for example, tungsten is provided on the insulation film 63. The light blocking film 64 includes first eccentric openings 64a formed on the photoelectric conversion elements $PD_A$, and second eccentric openings 64b formed on the photoelectric conversion elements $PD_B$.

The first eccentric opening 64a is formed at a position shifted leftward in the figure from the center of the photoelectric conversion element $PD_A$. Consequently, a nearly right half region of the photoelectric conversion element $PD_A$ (referred to simply as a right region below) is covered by the light blocking film 64 and, by contrast with this, a nearly left half region (referred to simply as a left region below) is exposed. Meanwhile, the second eccentric opening 64b is formed at a position shifted rightward in the figure from the center of the photoelectric conversion element $PD_B$. Consequently, the left region of the photoelectric conversion element $PD_B$ is covered by the light blocking film 64 and, by contrast with this, the right region is exposed.

A light transmissive planarized layer 65 whose surface is flat is provided on the light blocking film 64. Each of the filters 34R, 34G and 34B is provided on the planarized layer 65 according to the color filter array illustrated in FIG. 22.

A microlens 66 is provided above each of the filters 34R, 34G and 34B at a position directly above each of the photoelectric conversion elements $PD_A$ and $PD_B$. Note that a reference numeral O2 in the figure designates an optical axis of the microlens 66. The optical axis O2 of the microlens 66 is positioned above the center of each of the photoelectric conversion elements $PD_A$ and $PD_B$.

Subject lights 67R incident on the microlenses 66 from the diagonal right direction in the figure are condensed on the left regions of the photoelectric conversion elements $PD_A$ through the first eccentric openings 64a by the microlenses 66, and are not condensed on the left regions of the photoelectric conversion elements $PD_B$ covered by the light blocking film 64. By contrast with this, subject lights 67L incident on the microlenses 66 from the diagonal right direction in the figure are condensed on the right regions of the photoelectric conversion elements $PD_B$ through the second eccentric openings 64b by the microlenses 66, and are not condensed on the right regions of the photoelectric conversion elements $PD_A$ covered by the light blocking film 64.

Thus, the photoelectric conversion elements $PD_A$ (first group pixels 46A) become highly sensitive to the subject lights 67R, and the photoelectric conversion elements $PD_B$ (second group pixels 46B) become highly sensitive to the subject lights 67L. Note that the subject lights 67R and 67L transmit through regions symmetric to the optical axis O1 of the lens unit 13 (the zoom lens 14 and the focus lens 15) and regions symmetric to the optical axes O2 of the microlenses 66. Note that the region symmetric to the optical axis O1 of the lens unit 13 is a region (left and right regions of the lens unit 13) acquired by dividing the lens unit 13 by a line segment orthogonal to the optical axis O1 and parallel to the pixel array in the vertical direction (see FIG. 9).

Each Configuration of Digital Camera According to Third Embodiment

Back to FIG. 21, an image processing circuit 59 generates normally-shot image data upon the normal shooting mode, and generates disparity image data configured by disparity images of two viewpoints (R viewpoint and L viewpoint) upon the 3D shooting mode. The image processing circuit 59 is basically the same as the image processing circuit 43 according to the second embodiment except that a disparity image generating unit (fourth image generating device) 69 is provided instead of the high sensitivity image generating unit 51, the high resolution image generating unit 52 and the wide DR image generating unit 53.

Figure 25:
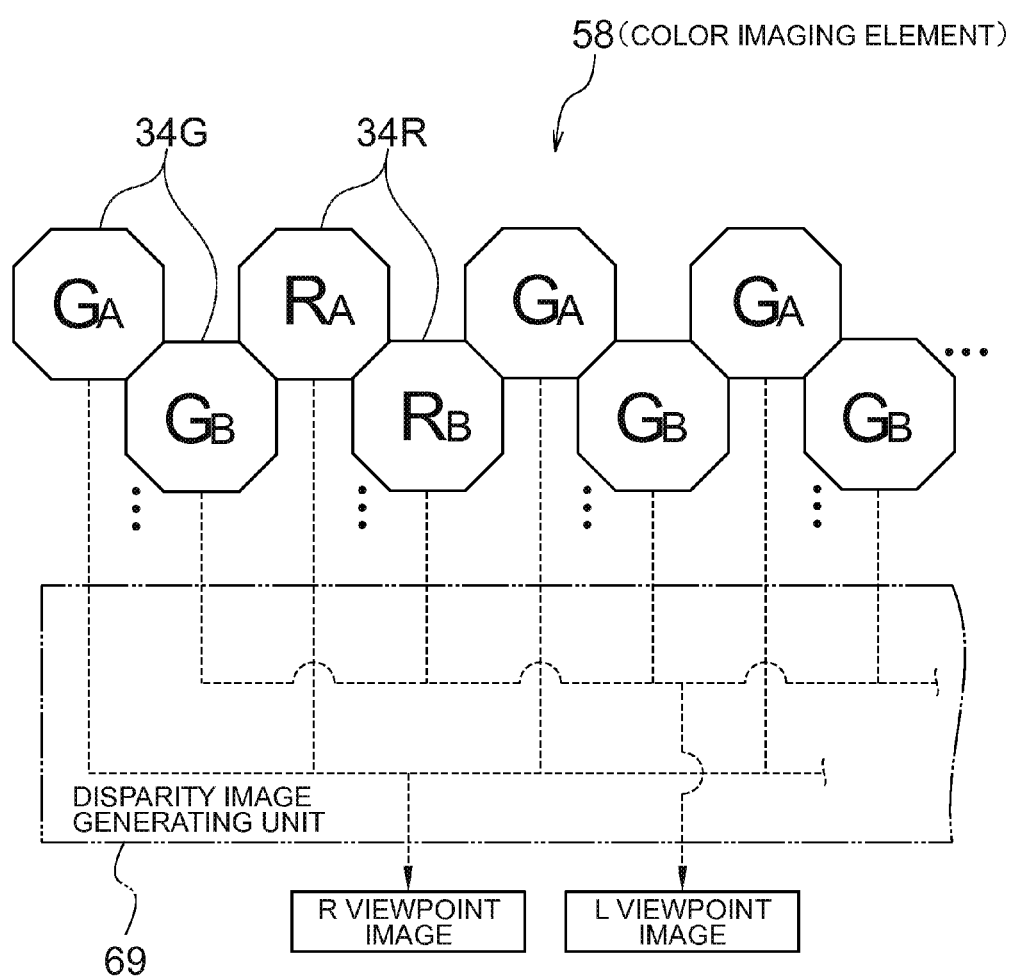
FIG. 25 is a view for explaining disparity image data (R, L viewpoint image data) generation processing performed by a disparity image generating unit.

As illustrated in FIG. 25, upon the 3D shooting mode, the disparity image generating unit 69 generates R viewpoint image data (first image) illustrating a subject from an R viewpoint side based on output signals from the first group pixels 46A, and generates L viewpoint image data (second image) illustrating a subject from an L viewpoint side based on output signals from the second group pixels 46B. A disparity is produced between the R viewpoint image data and the L viewpoint image data, so that it is possible to provide stereoscopic views.

Various monitors which enable observation of stereoscopic images based on R viewpoint image data and L viewpoint image data are used for a display unit 60 (see FIG. 21). Note that various known methods such as a lenticular method, a disparity barrier method, a parallax barrier method, an anaglyph method, a frame sequential method and a right direction method may be used for a method of displaying stereoscopic images.

Actions of Digital Camera According to Third Embodiment

Figure 26:
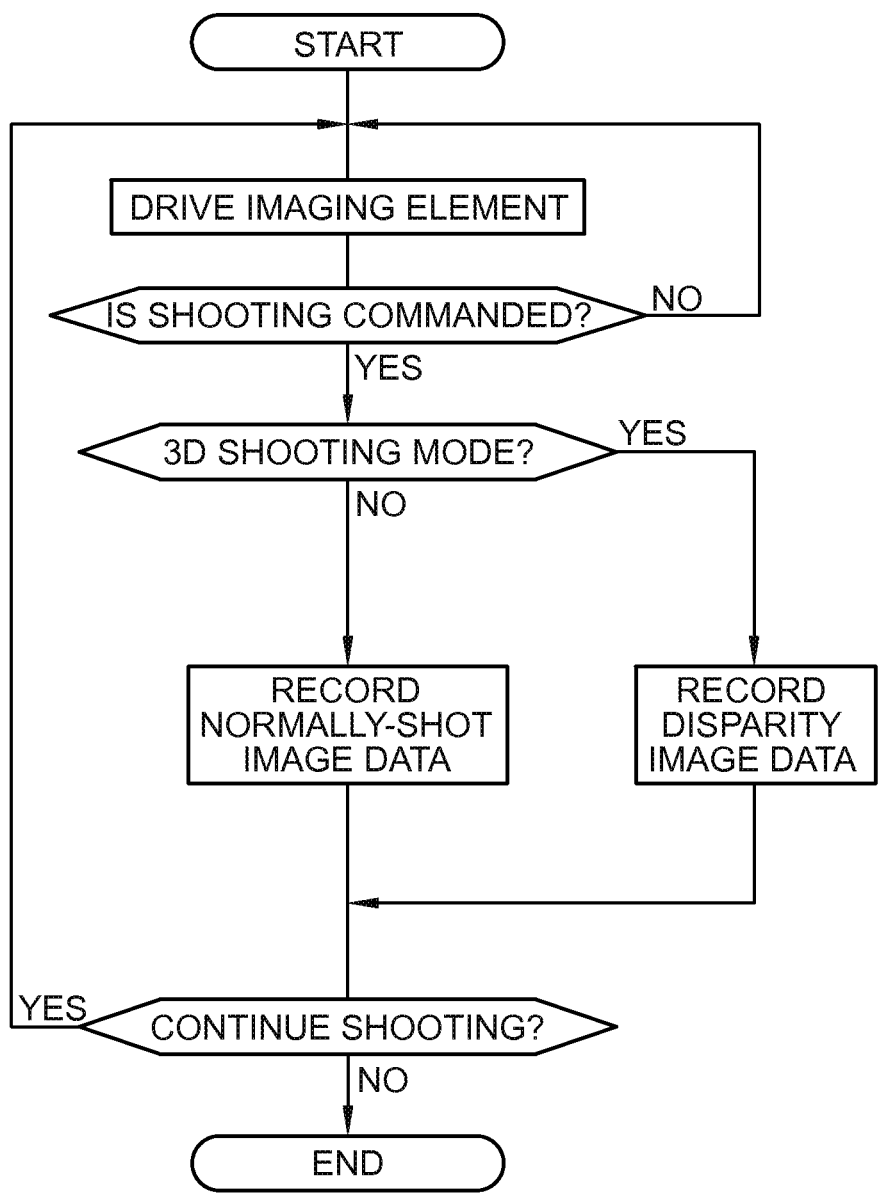
FIG. 26 is a view for explaining a function of the digital camera according to the third embodiment.

Next, actions of the digital camera 55 employing the above-mentioned configuration are described with reference to FIG. 26. Note that a processing flow when the shooting mode is set to the normal shooting mode is the same as the processing flow according to the second embodiment, and therefore is not specifically described.
[3D Shooting Mode]

When the shooting mode is set to the 3D shooting mode, the disparity image generating unit 69 operates, and generates R viewpoint image data and L viewpoint image data based on output signals from the first group pixels 46A and the second group pixels 46B, respectively, as illustrated in FIG. 25. The disparity image generating unit 69 outputs at least one of the R viewpoint image data and the L viewpoint image data to the display unit 60 at a certain timing. Consequently, a through image is displayed on the display unit 60.

When the operation unit 12 commands shooting, the disparity image generating unit 69 generates R viewpoint image data and L viewpoint image data of one frame. These R viewpoint image data and L viewpoint image data are compressed as disparity image data by the compression/extension processing circuit 29, and then are recorded in the memory card 31 through the media I/F 30. Note that the disparity image data recorded in the memory card 31 is stereoscopically displayed on the display unit 60 by switching an operation mode of the digital camera 55 to a playback mode.

Image data of high image quality and a high resolution, similar to the second embodiment, can be acquired according to the color filter array employing the above-mentioned configuration. Further, it is possible to simplify demosaicing processing or the like at a subsequent stage compared to the conventional random array.

Note that by narrowing the aperture provided to the mechanical shutter 16, a disparity amount between R viewpoint image data and L viewpoint image data becomes small, so that high sensitivity image data, high resolution image data and wide DR image data may be generated similar to the second embodiment.

Further, although the first and second eccentric openings 64a and 64b formed on the light blocking film 64 make the first group and second group pixels 46A and 46B highly sensitive to subject lights incident from different directions in the above-mentioned third embodiment, another method may be used. Instead of, for example, forming eccentric openings in a light blocking film, positions of microlenses on the first group and second group pixels 46A and 46B may be decentered in different directions.

Entire Configuration of Digital Camera According to Fourth Embodiment

Figure 27:
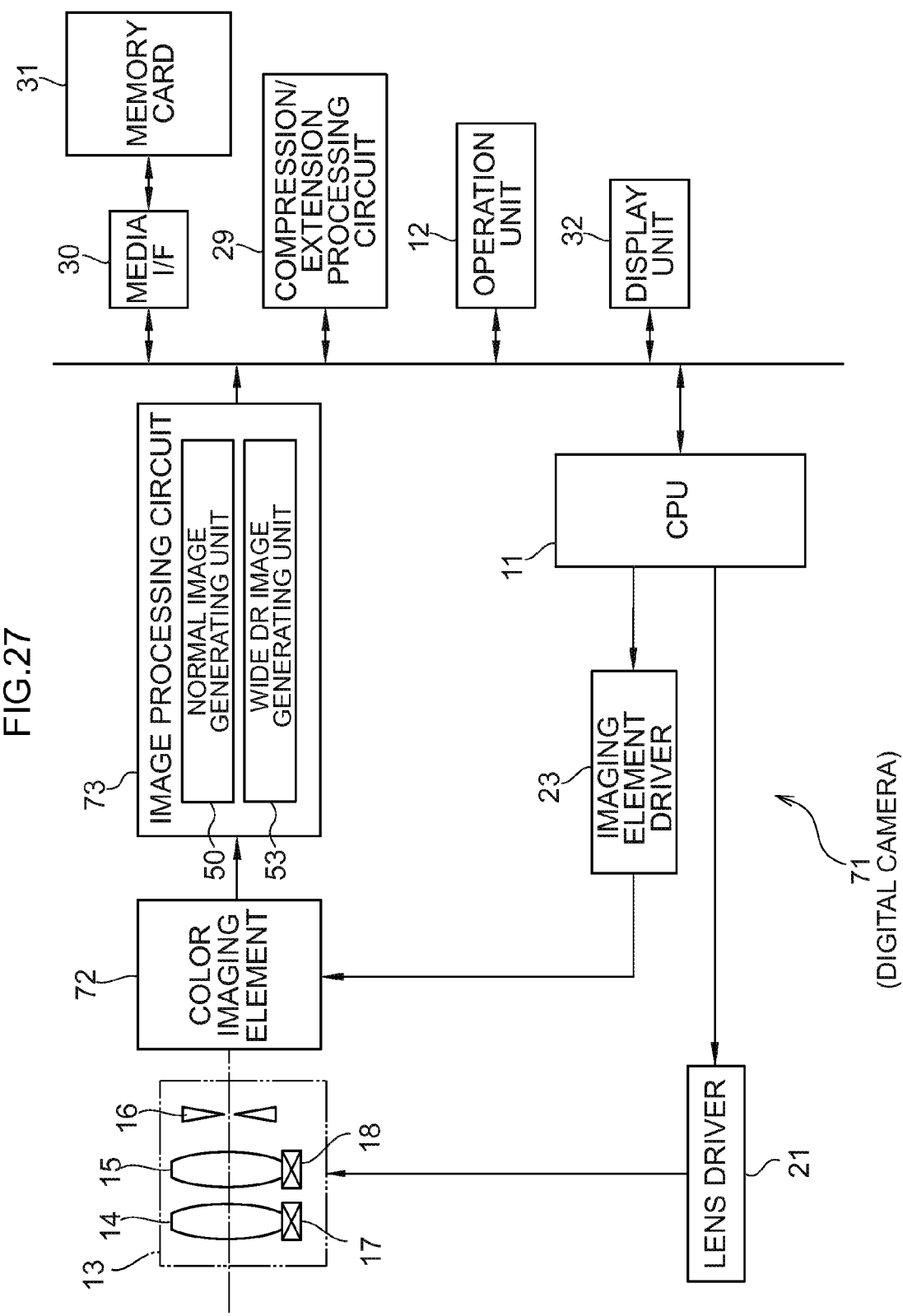
FIG. 27 is a view illustrating a digital camera of the fourth embodiment that has a single-plate color imaging element according to the present invention.

FIG. 27 is a block diagram of a digital camera (imaging apparatus) 71 of the fourth embodiment that has a color imaging element according to the present invention. In the above-mentioned second embodiment, wide DR image data (high sensitivity image data and low sensitivity image data) is generated by independently controlling charge accumulation times of the first group pixels 46A (A side) and the second group pixels 46B (B side) upon the wide DR shooing mode. By contrast with this, a digital camera 71 generates wide DR image data without changing charge accumulation times of the A side and the B side.

The digital camera 71 employs basically the same configuration as the configuration according to the second embodiment except that the digital camera 71 has a color imaging element 72 and an image processing circuit 73 different from the digital camera 39 according to the second embodiment, and the same function and configuration as the function and configuration according to the second embodiment are assigned same reference numerals and the description thereof is omitted.

Color Imaging Element According to Fourth Embodiment

Figure 28:
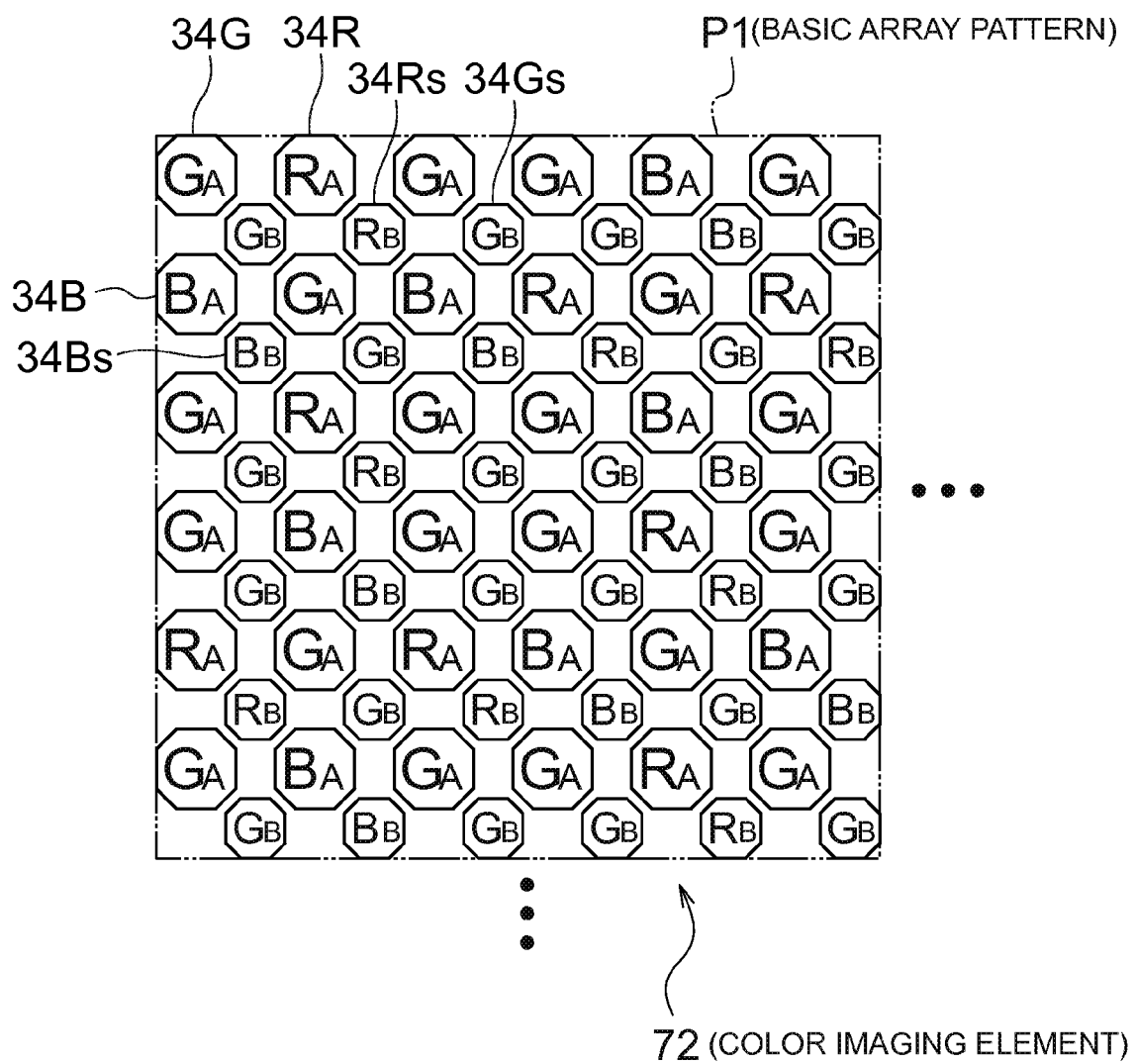
FIG. 28 is a view illustrating a color filter array of the color imaging element according to the fourth embodiment.

As illustrated in FIG. 28, a pixel array of the color imaging element 72 is the same as the pixel array of the color imaging element 41 according to the second embodiment. Meanwhile, in the color imaging element 72, areas of the second group pixels 46B (photoelectric conversion elements $PD_B$) are smaller than areas of the first group pixels 46A (photoelectric conversion elements $PD_A$). Hence, the amounts of accumulated signal charges of the second group pixels 46B are smaller than the amounts of accumulated signal charges of the first group pixels 46A. Consequently, the first group pixels 46A are relatively "high sensitivity pixels", and the second group pixels 46B are relatively "low sensitivity pixels".

Further, areas of $R_B$, $G_B$, and $B_B$ filters 34Rs, 34Gs, and 34Bs are smaller than areas of the $R_A$, $G_A$ and $B_A$ filters 34R, 34G and 34B. Hence, the color filter array of the color imaging element 72 is basically the same as the color filter array according to the second embodiment except that areas of $R_B$, $G_B$ and $B_B$ filters 34Rs, 34Gs and 34Bs are formed to be smaller. Consequently, the color filter array of the color imaging element 72 includes the feature (7) of the color filter array according to the second embodiment in addition to the same features as the features (1), (2), (3) and (4) of the color filter array according to the first embodiment.

Consequently, it is possible to acquire a high sensitivity image based on output signals from the first group pixels 46A, and acquire a low sensitivity image based on output signals from the second group pixels 46B, without changing charge accumulation times of the A side and the B side.

Back to FIG. 27, the wide DR image generating unit 53 of the image processing circuit 73 operates upon the wide DR image generation mode, and generates high sensitivity image data and low sensitivity image data based on an output signal from each of the first group and second group pixels 46A and 46B, and generates wide DR image data based on these both items of image data. According to the color filter array employing the above-mentioned configuration, it is possible to acquire image data of high image quality and a high resolution similar to the second embodiment. Further, it is possible to simplify demosaicing processing or the like at a subsequent stage compared to the conventional random array.

Note that the actions of the digital camera 71 are basically the same as the actions of the digital camera 39 according to the second embodiment, and therefore description thereof is omitted.

Color Imaging Element According to Fourth-1 Embodiment

Although the digital camera 71 according to the fourth embodiment generates wide DR image data by making areas of the first and second group pixels 46A and 46B different, amounts of subject lights incident on the first and second group pixels 46A and 46B may be made different by a method other than a method of making areas different.

Figure 29:
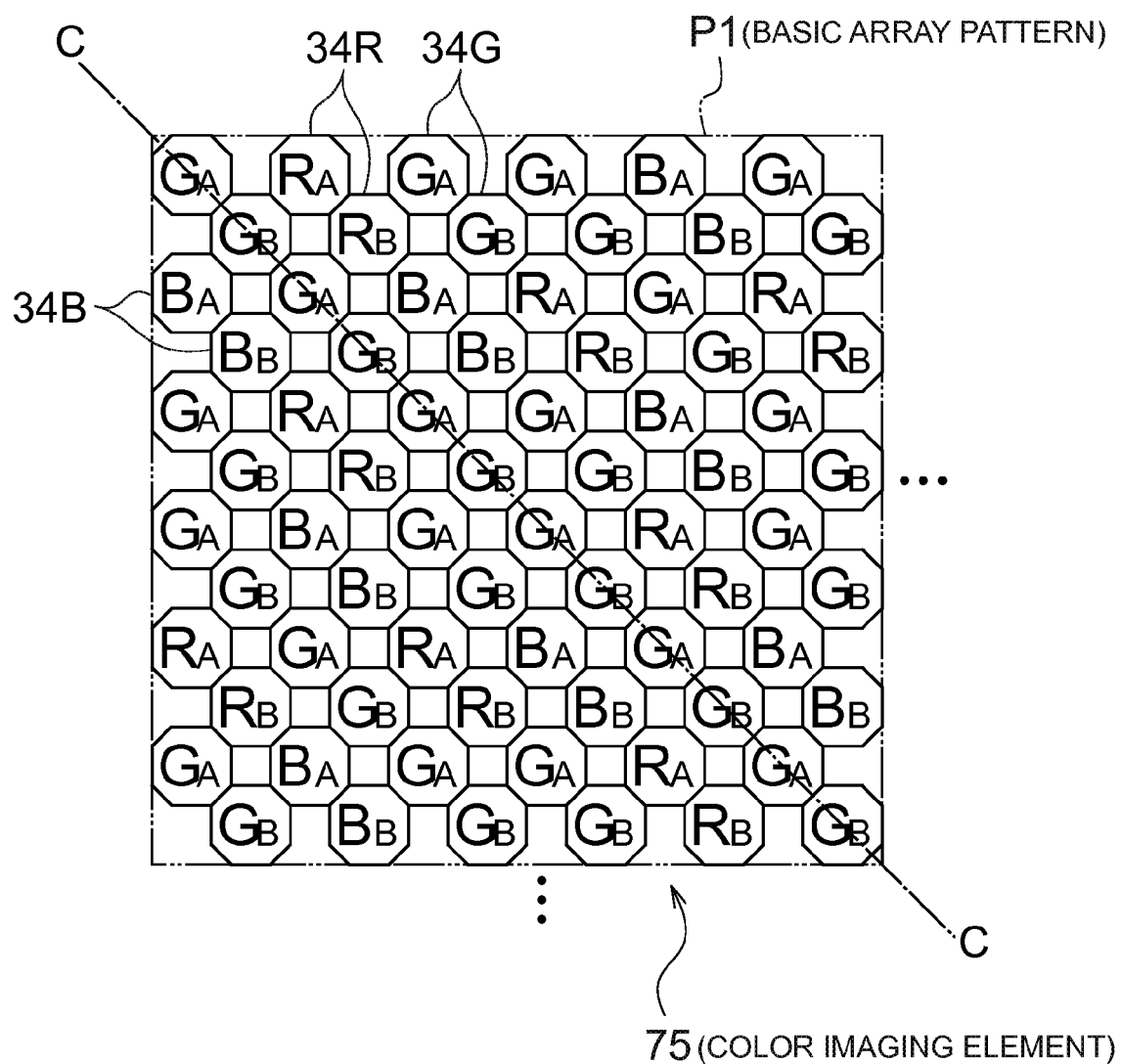
FIG. 29 is a view illustrating a color filter array of a color imaging element according to the fourth-1 embodiment.
Figure 30:
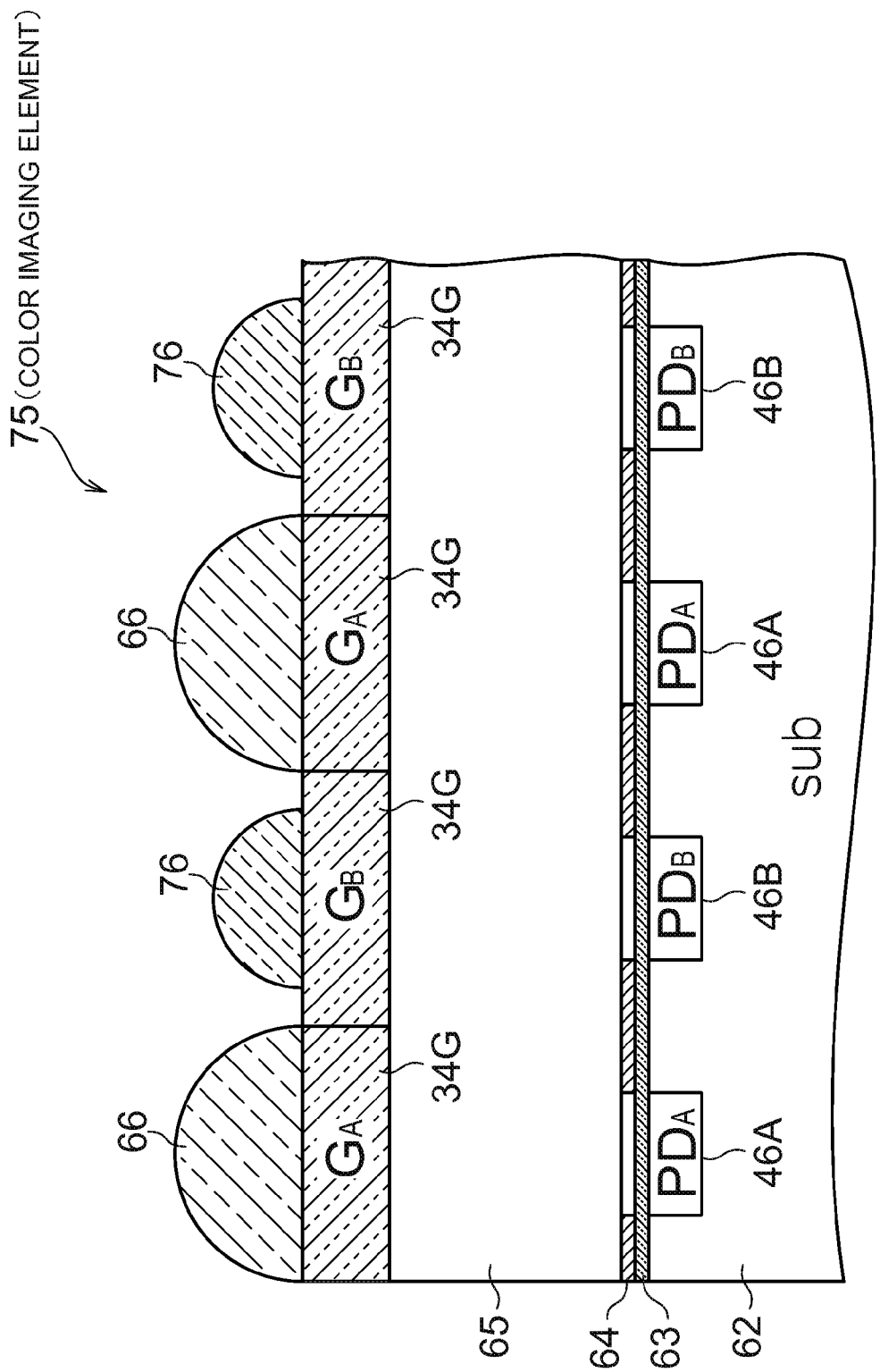
FIG. 30 is a view illustrating a cross section along a CC line in FIG. 29.

In, for example, FIG. 29 and FIG. 30 illustrating the cross section along a CC line in FIG. 29, a color imaging element 75 employs basically the same configuration as the configuration of the color imaging element 41 according to the second embodiment. Meanwhile, in the color imaging element 75, sizes of microlenses 76 positioned above the second group pixels 46B (photoelectric conversion elements $PD_B$) are formed smaller than sizes of the microlenses 66 positioned above the first group pixels 46A (photoelectric conversion elements $PD_A$).

By forming the microlenses 76 smaller, amounts of subject lights condensed on the second group pixels 46B lower compared to amounts of subject lights condensed on the first group pixels 46A. Consequently, amounts of accumulated signal charges of the second group pixels 46B are smaller than amounts of accumulated signal charges of the first group pixels 46A. Consequently, similar to the fourth embodiment, the first group pixels 46A become relatively "high sensitivity pixels", and the second group pixels 46B become relatively "low sensitivity pixels".

Thus, even when the color imaging element 72 according to the fourth embodiment is replaced with the color imaging element 75, it is possible to acquire wide DR image data similar to the fourth embodiment. Further, the color filter array is the same as the color filters according to the second and third embodiments, so that it is possible to acquire wide DR image data of high image quality and high resolution, and simplify demosaicing processing or the like at a subsequent stage.

Color Imaging Element According to Fourth-2 Embodiment

Figure 31:
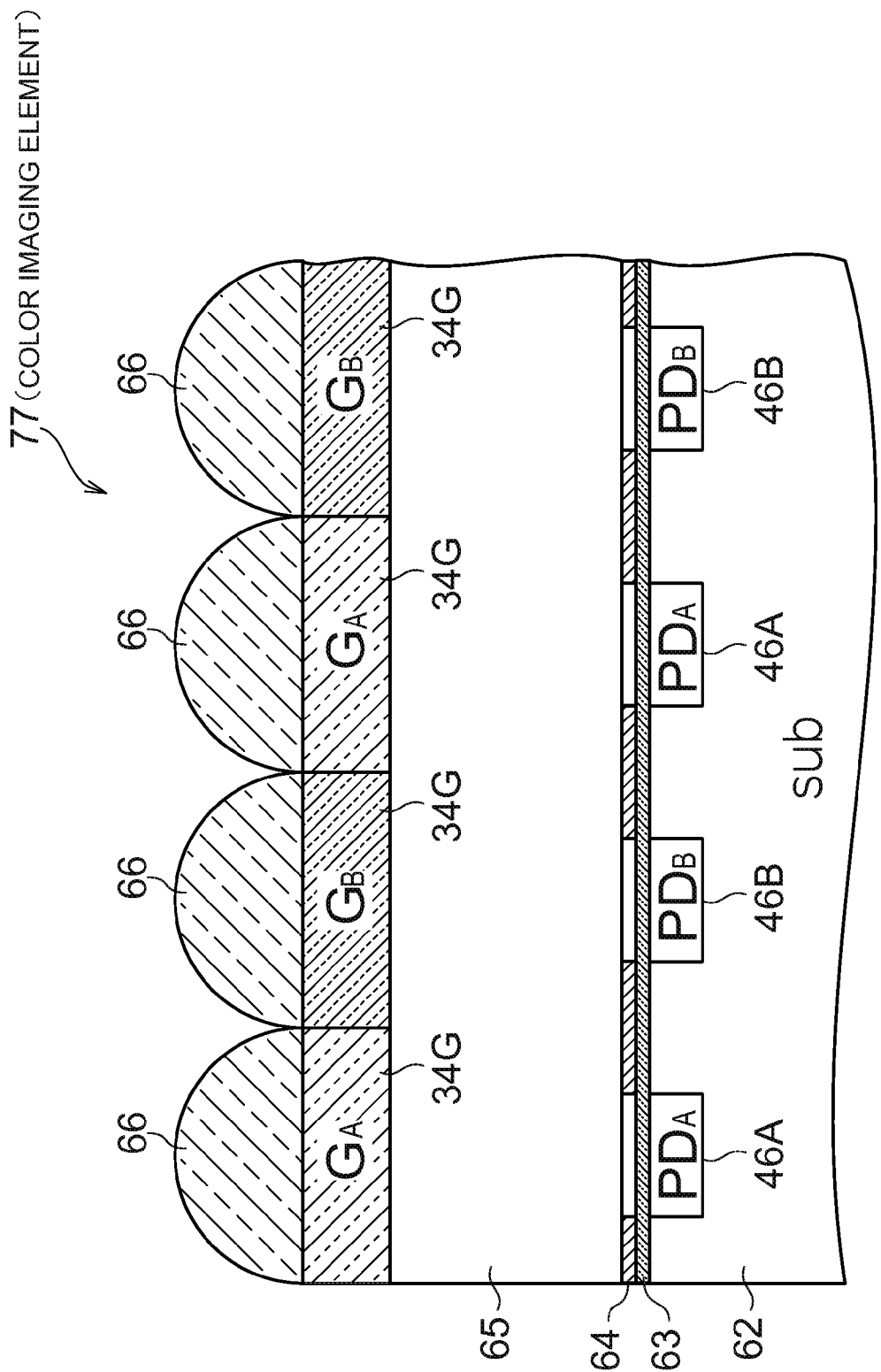
FIG. 31 is a view illustrating a cross section of a color imaging element according to the fourth-2 embodiment.

Further, although the color imaging element 75 according to the fourth-1 embodiment can acquire wide DR image data by making the sizes of the microlenses 66 and 76 different, optical transmittances of the $R_A$, $G_A$ and $B_A$ filters 34R, 34G and 34B and the $R_B$, $G_B$ and $B_B$ filters 34R, 34G and 34B may be made different as in the color imaging element 77, for example, illustrated in FIG. 31.

Specifically, the optical transmittances of the $R_B$, $G_B$ and $B_B$ filters 34R, 34G and 34B are lower than the optical transmittances of the $R_A$, $G_A$ and $B_A$ filters 34R, 34G and 34B. Note that although FIG. 31 illustrates the G filters 34G as a typical example, the same also applies to other R filters 34R and B filters 34B.

By lowering the optical transmittances of the $R_B$, $G_B$ and $B_B$ filters 34R, 34G and 34B, the amounts of subject lights condensed on the second group pixels 46B lower compared to the amounts of subject lights condensed on the first group pixels 46A. Hence, similar to the fourth-1 embodiment, the first group pixels 46A are relatively "high sensitivity pixels", and the second group pixels 46B are relatively "low sensitivity pixels".

Thus, even when the color imaging element 72 according to the fourth embodiment is replaced with the color imaging element 77, it is possible to acquire wide DR image data of high image quality and high resolution, and further simplify demosaicing processing or the like at a subsequent stage, similar to the fourth and fourth-1 embodiments.

[Other]

Although the basic array pattern P1 includes an array pattern corresponding to 12×12 pixels (the basic array patterns $P_A$ and $P_B$ are 6×6 pixels, respectively) in the above-mentioned second embodiment to the above-mentioned fourth-2 embodiment, the basic array pattern P1 may include an array pattern corresponding to arbitrary M×N (maybe M=N or M≠N) pixels as long as the color filter array satisfies at least the above-mentioned features (1) to (4). In this case, the basic array patterns $P_A$ and $P_B$ are array patterns corresponding to (M/2)×(N/2) pixels.

Note that it is preferable that M and N are 20 or less. This is because, when M and N exceed 20, while signal processing such as demosaicing processing becomes complicated, a special effect cannot be provided even by increasing a size of the basic array pattern.

Arrangements of the R filters 34R and the B filters 34B according to each of the above-mentioned embodiments are not limited to the arrangements illustrated in each of the above-mentioned figures, and the arrangements may be adequately changed as long as at least the above-mentioned feature (4) is satisfied. Further, although first group pixels and second group pixels of the same color (color filters of the same color) are arranged adjacently in the diagonal direction (NW) in each of the above-mentioned embodiments, the first group pixels and the second group pixels may be arranged adjacently in the diagonal direction (NE).

Modified Example

Further, although, in each of the above-mentioned embodiments, the description has been made about the examples where green (G) is adopted as the first color and red (R) and blue (B) are adopted as the second color, the colors which can be used for a color filter are not limited to these colors, and a color filter corresponding to a color satisfying the following conditions can also be used.

<Conditions of First Filter (First Color)>

Although in each embodiment, the description has been made about the example where G filter of the G color is regarded as the first filter having the first color of the present invention, a filter which satisfies one of the following conditions (1) to (4) may be used instead of the G filter or instead of part of the G filters.

[Condition (1)]

The condition (1) is that a contribution rate for acquiring a brightness signal is 50% or more. This contribution rate 50% is a value determined to distinguish between the first color (e.g. the G color) and the second color (e.g. R and B colors) of the present invention, and is a value determined so that the "first color" includes a color whose contribution rate for acquiring brightness data is relatively higher than the contribution rates of the R color and the B color or the like.

Note that the colors whose contribution rates are less than 50% are the second color (e.g. the R color, the B color or the like) of the present invention, and filters which have these colors are the second filters of the present invention.

[Condition (2)]

The condition (2) is that a peak of a filter transmittance is in a range of wavelength 480 nm or more and 570 nm or less. A value measured by, for example, a spectral meter is used for the filter transmittance. This wavelength range is a range determined to distinguish between the first color (e.g. the G color) and the second color (e.g. the R and B colors) of the present invention, and is a range determined not to include peaks of the R color, the B color and the like whose contribution rates described above are relatively low and to include a peak of the G color and the like whose contribution rate is relatively high. Hence, a filter whose peak of the transmittance is in the range of wavelength 480 nm or more and 570 nm or less can be used for the first filter. Note that the filters whose peaks of the transmittances are outside the range of wavelength 480 nm or more and 570 nm or less are the second filters (the R filter and the B filter) of the present invention.

[Condition (3)]

The condition (3) is that the transmittance in a range of wavelength 500 nm or more and 560 nm or less is higher than the transmittances of the second filters (the R filter and the B filter). Again in this condition (3), a value measured by, for example, a spectral meter is used for the filter transmittance. The wavelength range of this condition (3) is a range determined to distinguish between the first color (e.g. the G color) and the second color (e.g. R and B colors) of the present invention, and is a range in which the transmittance of a filter including a color whose contribution rate described above is relatively higher than the R color and the B color or the like is higher than the transmittances of the R B filters. Consequently, it is possible to use as the first filter a filter whose transmittance is relatively high in the range of wavelength 500 nm or more and 560 nm or less, and use as the second filters the filters whose transmittances are relatively low.

[Condition (4)]

The condition (4) is to use the filters of two or more colors which include the color contributing the most to a brightness signal (e.g. the G color of RGB) out of three primary colors and a color different from these three primary colors, as the first filters. In this case, filters corresponding to colors other than each color of the first filters are the second filters.

<A Plurality Types of First Filter (G Filter)>

Consequently, G filters of the G color as the first filter is not limited to one type, and, for example, a plurality of types of G filters (G1 filter, G2 filter) can also be used as the first filters. That is, the G filters of a color filter (basic array pattern) according to each of the above-mentioned embodiments may be adequately replaced with the G1 filters or the G2 filters. The G1 filter allows transmission of G light of a first wavelength band, and the G2 filter allows transmission of G light of a second wavelength band which is highly correlated with the G1 filter (see FIG. 32).

Existing G filters (e.g. the G filters according to the first embodiment) can be used for the G1 filters. Further, filters which are highly correlated with the G1 filters can be used for the G2 filters. In this case, a peak value of a spectral sensitivity curve of a light receiving element on which the G2 filter is arranged is desirably in the range of wavelength, for example, 500 nm to 535 nm (near a peak value of a spectral sensitivity curve of the light receiving element on which the existing G filter is arranged). Note that a method described in, for example, Japanese Patent Application Laid-Open No. 2003-284084 can be used for the method of determining color filters of four colors (R, G1, G2 and B).

By setting four types of colors of an image acquired by a color imaging element and increasing pieces of color information to be acquired in this way, it is possible to more accurately express colors compared to a case where only three types of colors (RGB) are acquired. That is, it is possible to reproduce colors which seem different to the eyes as different colors and colors which seem the same to the eyes as the same colors (to enhance "the color determinability").

Note that the transmittances of the G1 and G2 filters are basically the same as the transmittance of the G filter according to the first embodiment, and the contribution rate for acquiring a brightness signal is higher than 50%. Hence, the G1 and G2 filters satisfy the above-mentioned condition (1).

Figure 32:
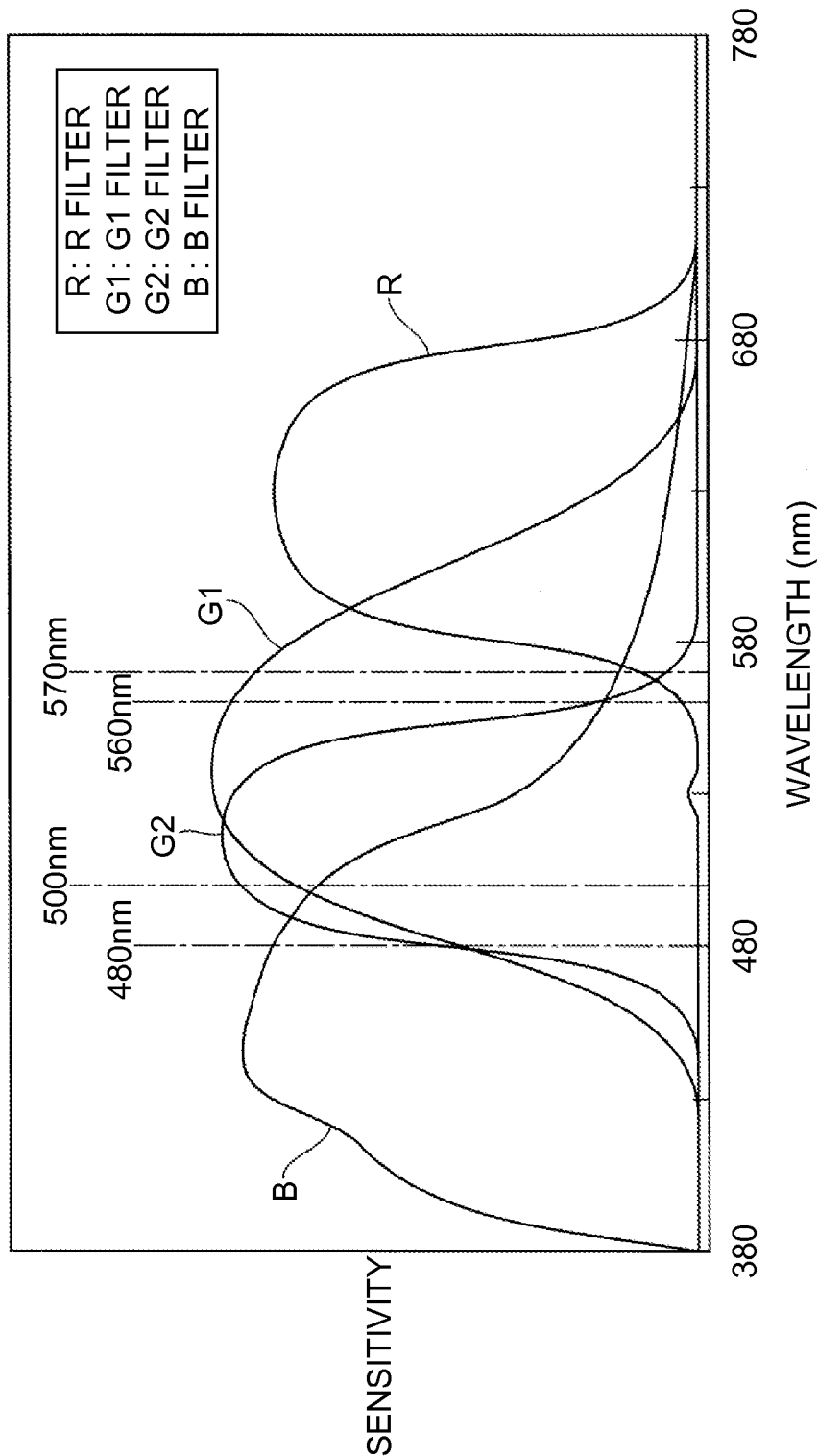
FIG. 32 is a graph illustrating spectral sensitivity characteristics of light receiving elements on which an R filter (red filter), a G1 filter (first green filter), a G2 filter (second green filter) and a B filter (blue filter) are arranged.

Further, in FIG. 32 which illustrates spectral sensitivity characteristics of a color filter array (light receiving element), a peak of the transmittance of each of the G1 and G2 filters (a peak of the sensitivity of each G pixel) is in the range of wavelength 480 nm or more and 570 nm or less. The transmittance of each of the G1 and G2 filters is higher than the transmittances of R and B filters in the range of wavelength 500 nm or more and 560 nm or less. Hence, each of the G1 and G2 filters also satisfies the above-mentioned conditions (2) and (3).

Note that the arrangement and the number of each of the G1 and G2 filters may be adequately changed. Further, types of G filters may be increased to three types or more.

<Transparent Filter (W Filter)>

Although color filters including chromatic filters corresponding to RGB colors have been mainly described in the above-mentioned embodiments, part of these chromatic filters may be transparent filters W (white pixels). The transparent filters W are preferably arranged instead of a part of the first filters (G filters) in particular. Consequently, by replacing a part of G pixels with white pixels, it is possible to suppress deterioration of color reproducibility even when a pixel size is miniaturized.

The transparent filter W is a filter of a transparent color (first color). The transparent filter W is a filter which allows transmission of light corresponding to a wavelength band of visible light, and whose transmittance of light, for example, of each color of RGB is 50% or more. The transmittance of the transparent filter W is higher than the transmittance of the G filter, and the contribution rate for acquiring a brightness signal is also higher than the G color (60%), so that the above-mentioned condition (1) is satisfied.

Figure 33:
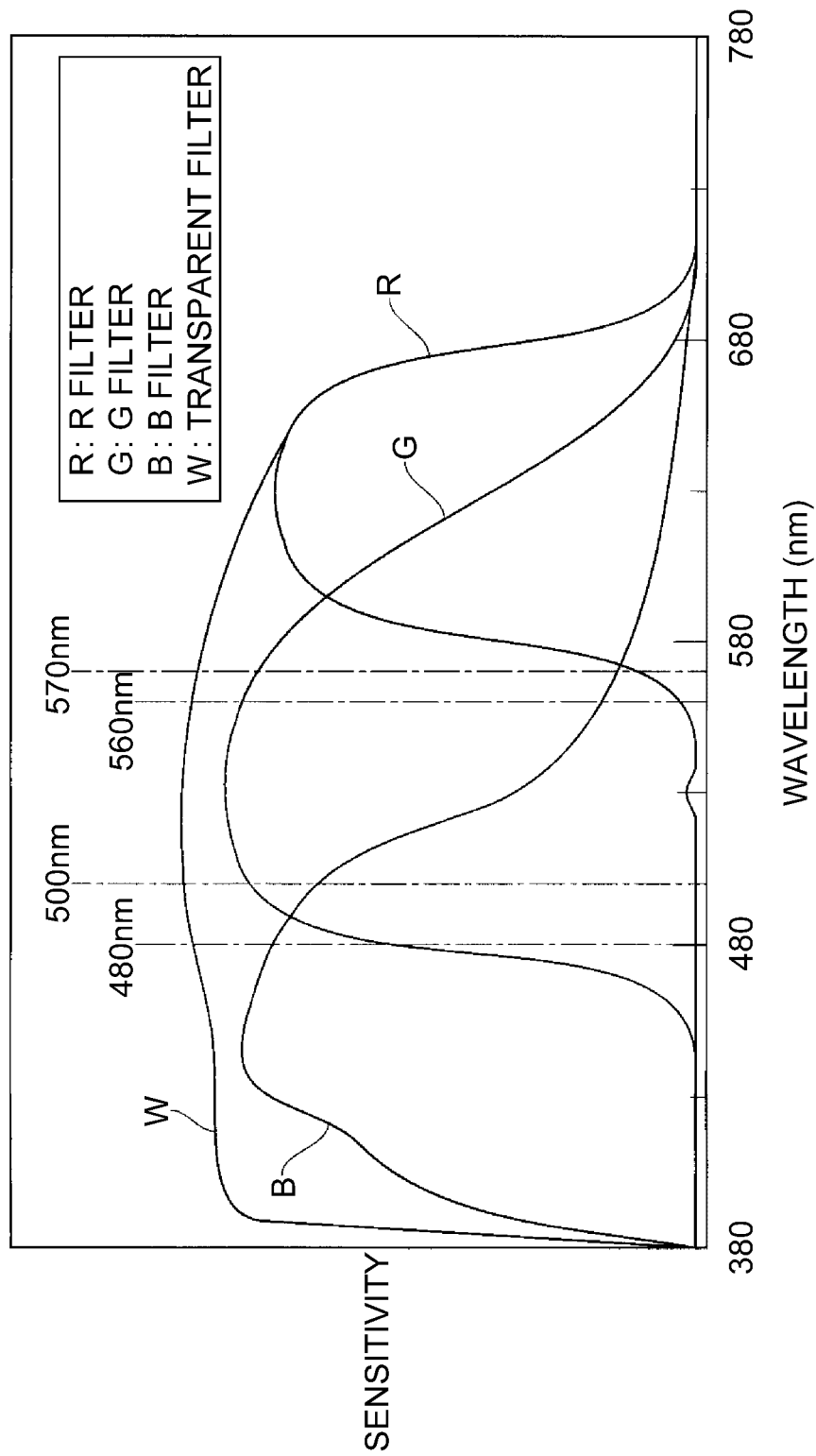
FIG. 33 is a graph illustrating spectral sensitivity characteristics of light receiving elements on which the R filter, the G filter, the B filter and a W filter (transparent filter) are arranged.

In FIG. 33 which illustrates spectral sensitivity characteristics of a color filter array (light receiving element), a peak of the transmittance of the transparent filter W (a peak of the sensitivity of a white pixel) is in the range of wavelength 480 nm or more and 570 nm or less. Further, the transmittance of the transparent filter W is higher than the transmittances of R and B filters in the range of wavelength 500 nm or more and 560 nm or less. Hence, the transparent filter W also satisfies the above-mentioned conditions (2) and (3). Note that the G filter also satisfies the above-mentioned conditions (1) to (3) similar to the transparent filter W.

As described above, the transparent filter W satisfies the above-mentioned conditions (1) to (3), and can be used for the first filter of the present invention. Note that in the color filter array, a part of the G filters corresponding to the G color which contributes the most to a brightness signal among the three primary colors RGB is replaced with the transparent filters W, and, consequently, the transparent filter W also satisfies the above-mentioned condition (4).

<Emerald Filter (E Filter)>

Although a color filter formed with chromatic filters corresponding to RGB colors has been mainly described in the above-mentioned embodiments, a part of these chromatic filters may be other chromatic filters, and may be, for example, filters E (emerald pixels) corresponding to an emerald (E) color. The emerald filters (E filters) may be arranged instead of a part of the first filters (G filters) in particular. Thus, by using a color filter array of four colors whose part of G filters are replaced with the E filters, it is possible to enhance reproducibility of high band components of brightness, reduce jagginess and enhance the sense of resolution.

Figure 34:
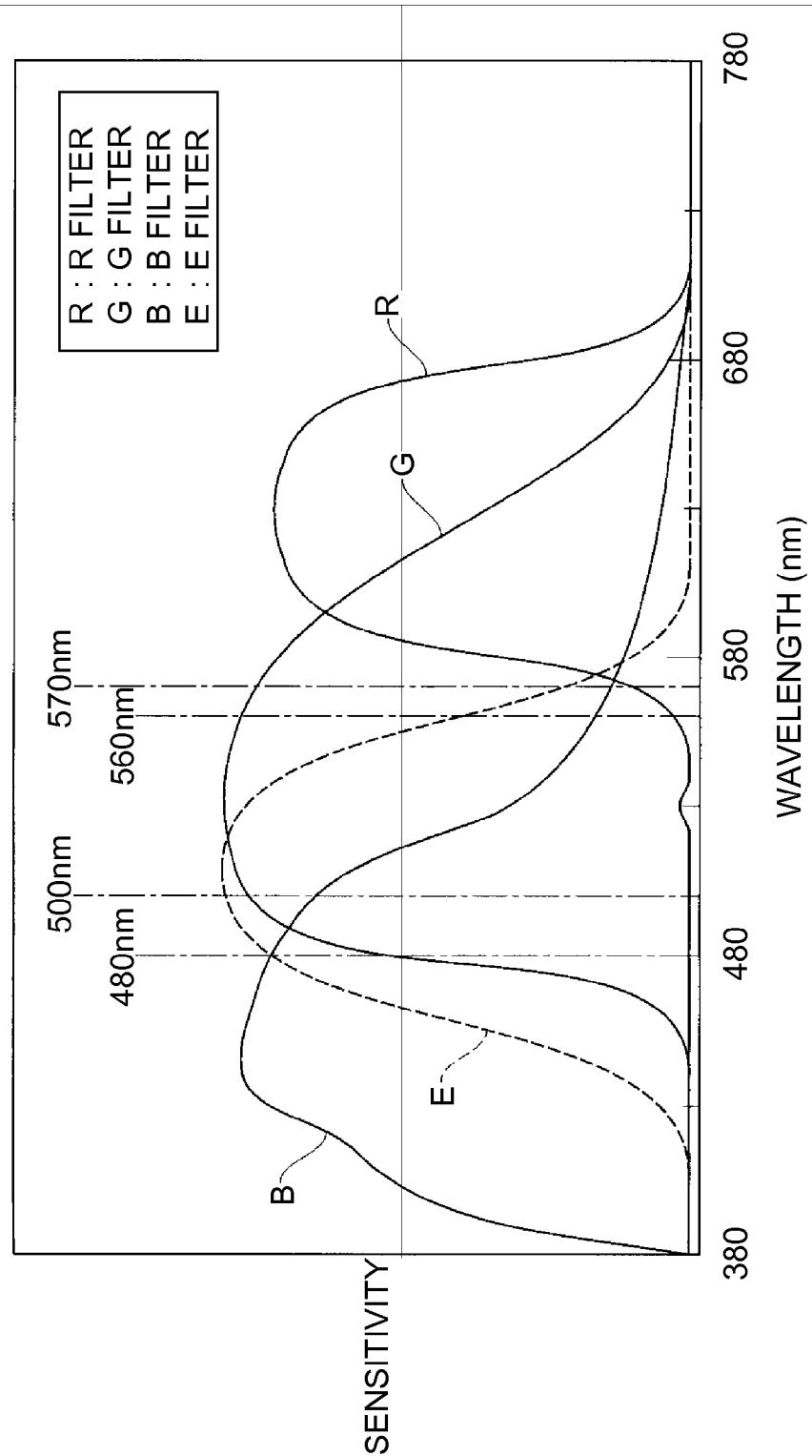
FIG. 34 is a graph illustrating spectral sensitivity characteristics of light receiving elements on which the R filter, the G filter, the B filter and an emerald filter (E filter) are arranged.
Figure 35:
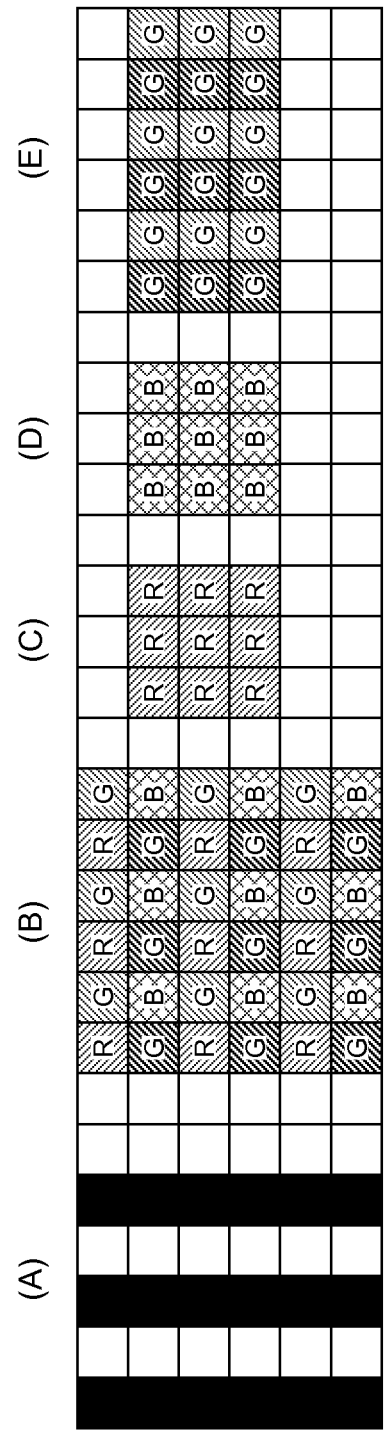
FIG. 35 is a view used to explain a problem of a color imaging element which has color filters of a conventional Bayer array.
Figure 36:
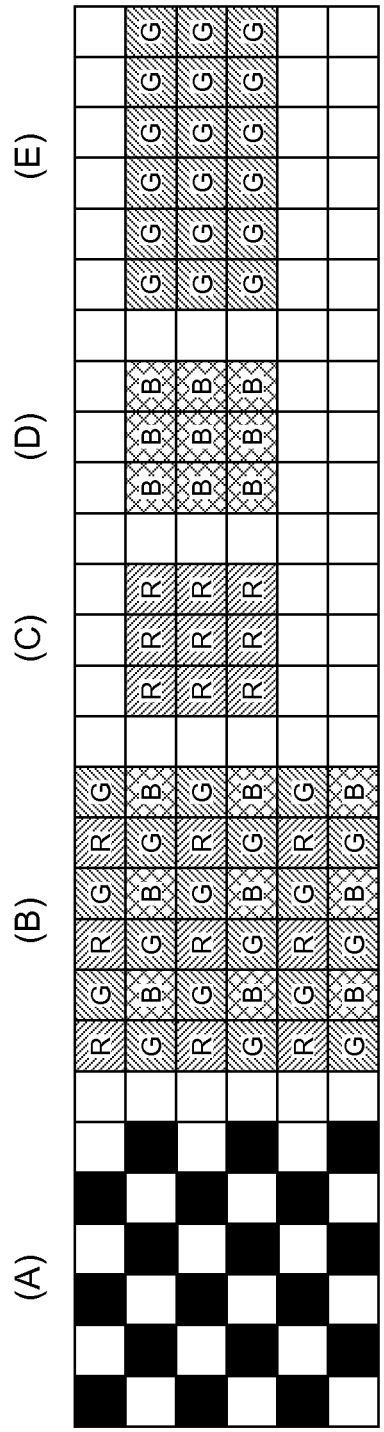
FIG. 36 is another view used to explain a problem of the color imaging element which has the color filters of the conventional Bayer array.

In FIG. 34 which illustrates spectral sensitivity characteristics of a color filter array (light receiving element), a peak of the transmittance of the emerald filter E (a peak of sensitivity of the E pixel) is in the range of wavelength 480 nm or more and 570 nm or less. Further, the transmittance of the emerald filter E is higher than the transmittances of the R B filters in the range of wavelength 500 nm or more and 560 nm or less. Hence, the emerald filter E satisfies the above-mentioned conditions (2) and (3). Further, in the color filter array, a part of the G filters corresponding to the G color which contributes the most to a brightness signal among the three primary colors of RGB are replaced with the emerald filters E, and consequently, the emerald filter E also satisfies the above-mentioned condition (4).

Note that in the spectral characteristics illustrated in FIG. 34, the emerald filter E has a peak closer to a short wavelength side than a peak of the G filter, but may have a peak closer to a long wavelength side than the peak of the G filter (the color looks like little yellow-tinged) in some cases. Thus, filters which satisfy each condition of the present invention can be selected for the emerald filter E, and, for example, the emerald filter E which satisfies the condition (1) can also be selected.

<Types of Other Colors>

Although the color filter array formed with color filters of the primary colors RGB has been described in each of the above-mentioned embodiments, the present invention is also applicable to, for example, a color filter array of complementary color filters having four colors consisting of G and the complementary colors of the primary colors RGB which are C (cyan), M (magenta) and Y (yellow). Also in this case, color filters which satisfy one of the above-mentioned conditions (1) to (4) are the first filters, and other color filters are the second filters.

<Honeycomb Arrangement>

Although each color filter array according to each of the above-mentioned embodiments includes a basic array pattern formed by two-dimensionally arraying a color filter of each color in the horizontal direction (H) and the vertical direction (V), and is formed by repeatedly arranging the basic array patterns in the horizontal direction (H) and the vertical direction (V), the present invention is not limited to this.

For example, a basic array pattern of so-called honeycomb array configured by rotating the basic array pattern of each of the above-mentioned embodiments by 45° around the optical axis may be used, and a color filter may be configured by an array pattern in which the basic array pattern is repeatedly arranged in the diagonal directions (NE and NW).

Although a digital camera has been described as an example of the imaging apparatus which has the color imaging element according to the present invention in each of the above-mentioned embodiments, the present invention may be applicable to various types of imaging apparatus such as endoscopes.

Further, needless to say, the present invention is not limited to the above-mentioned embodiments, and various modifications can be made as long as the modifications do not deviate from the spirit of the present invention.

What is claimed is:

1. A color imaging element comprising:
   first group pixels which are formed with photoelectric conversion elements arrayed in a matrix pattern at a predetermined pixel interval in each of a horizontal direction and a vertical direction;
   second group pixels which are formed with photoelectric conversion elements arrayed at positions shifted half the predetermined pixel interval from each photoelectric conversion element of the first group pixels in each of the horizontal direction and the vertical direction; and
   color filters which are arrayed on each of the first and second group pixels according to a same specific color filter array, wherein
   each of the color filter array arranged on the first group pixels and the color filter array arranged on the second group pixels includes a basic array pattern in which first filters corresponding to a first color with one or more colors and second filters corresponding to a second color with two or more colors whose contribution rates for acquiring a brightness signal are lower than a contribution rate of the first color are arrayed, and is formed by repeatedly arranging the basic array pattern in the horizontal direction and the vertical direction,
   one or more of the first filters are arranged on each line in horizontal, vertical, diagonal upper right and diagonal lower right directions of the color filter array,
   one or more of the second filters corresponding to each color of the second color are arranged on each line in the horizontal and vertical directions of the color filter array in the basic array pattern, and
   a ratio of a number of pixels of the first color corresponding to the first filters is greater than a ratio of a number of pixels of each color of the second color corresponding to the second filters.

2. The color imaging element according to claim 1, wherein
   the first group pixels selectively receive subject lights which transmit through one of two different regions of a shooting optical system, and
   the second group pixels selectively receive the subject lights which transmit through the other one of the two regions.

3. The color imaging element according to claim 2, wherein the two regions are regions symmetric with respect to an optical axis of the shooting optical system.

4. The color imaging element according to claim 1, wherein sensitivities of the second group pixels are lower than sensitivities of the first group pixels.

5. The color imaging element according to claim 4, wherein areas of the second group pixels are smaller than areas of the first group pixels.

6. The color imaging element according to claim 4, wherein optical transmittances of the color filters on the second group pixels are lower than optical transmittances of the color filters on the first group pixels.

7. The color imaging element according to claim 4, wherein
microlenses are provided above each of the first and second filters, and
the microlenses positioned above the second group pixels are smaller than the microlenses positioned above the first group pixels.

8. An imaging apparatus comprising:
the color imaging element according to claim 1; and
a shooting optical system which forms subject light on an imaging plane of the color imaging element.

9. The imaging apparatus according to claim 8, comprising a first image generating device which generates an image by adding output signals outputted from each of the first and second group pixels, which are mutually adjacent in the diagonal upper right direction or in the diagonal lower right direction and are arranged below the color filters of a same color.

10. The imaging apparatus according to claim 8, comprising a second image generating device which generates an image including a larger number of pixels than each of numbers of pixels of the first and second group pixels based on output signals from the first group pixels and output signals from the second group pixels.

11. The imaging apparatus according to claim 8, comprising:
a charge accumulation time adjusting device which makes charge accumulation times of the second group pixels shorter than charge accumulation times of the first group pixels; and
a third image generating device which generates an image whose dynamic range is expanded based on an image configured by output signals from the first group pixels and an image configured by output signals from the second group pixels.

12. An imaging apparatus comprising:
the color imaging element according to claim 2;
a shooting optical system which forms subject light on an imaging plane of the color imaging element; and
a fourth image generating device which generates a disparity image including a first image configured by the output signals from the first group pixels and a second image configured by the output signals from the second group pixels.

13. An imaging apparatus comprising:
the color imaging element according to claim 4;
a shooting optical system which forms subject light on an imaging plane of the color imaging element; and
a third image generating device which generates an image whose dynamic range is expanded based on an image configured by output signals from the first group pixels and an image configured by output signals from the second group pixels.

* * * * *